(12) United States Patent
Sakamoto

(10) Patent No.: US 6,791,705 B1
(45) Date of Patent: Sep. 14, 2004

(54) COMMUNICATION CONTROL APPARATUS AND METHOD

(75) Inventor: Yoichi Sakamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/501,523

(22) Filed: Feb. 9, 2000

(30) Foreign Application Priority Data

Feb. 10, 1999 (JP) .......................................... 11-033318

(51) Int. Cl.[7] .......................... G06F 15/00; G06F 13/24
(52) U.S. Cl. ..................... 358/1.15; 358/1.13; 710/261; 710/263; 712/223; 712/226
(58) Field of Search ............................. 358/1.15, 1.13; 710/65, 261–263; 712/223–226; 375/359

(56) References Cited

U.S. PATENT DOCUMENTS

| | | | | |
|---|---|---|---|---|
| 5,504,929 A | * | 4/1996 | Blair et al. .................... | 710/65 |
| 6,298,438 B1 | * | 10/2001 | Thayer et al. .............. | 712/226 |
| 6,411,452 B1 | * | 6/2002 | Cloke .......................... | 360/51 |
| 6,421,754 B1 | * | 7/2002 | Kau et al. .................... | 710/261 |

FOREIGN PATENT DOCUMENTS

| | | | |
|---|---|---|---|
| WO | WO 95/14276 | * | 11/1994 |
| WO | WO 95/14276 | | 5/1995 |

* cited by examiner

*Primary Examiner*—Kimberly Williams
*Assistant Examiner*—Saeid Ebrahimi
(74) *Attorney, Agent, or Firm*—Fitzpatrick, Cella, Harper & Scinto

(57) ABSTRACT

This invention has as its object to achieve high-speed data transfer using an asynchronous transfer interface.

An encoding program encodes source data not to include byte data of a predetermined value. An arithmetic operation program EX-ORs the predetermined value, encoded data of interest, and immediately preceding output data so that neighboring data do not have identical values in units of bytes, and outputs the result as output data. A communication program sends the output data to a printer (7). In the printer (7), a clock is generated based on a change in received data, and received data is latched and decoded in synchronism with the clock.

19 Claims, 17 Drawing Sheets

F I G. 3

| COMMAND CODE C | DATA LENGTH | MEANING | EXAMPLE OF CODE | DATA EXPRESSED BY CODE |
|---|---|---|---|---|
| FROM 0 TO 0x3F | 0 (NONE) | (C+1) REPETITIONS OF "0x40" | 0x01 | 0x40  0x40 |
| FROM 0x41 TO 0x7F | 1 | (C−0x3F) REPETITIONS OF DATA | 0x41  0x55 | 0x55  0x55 |
| FROM 0x80 TO 0xBF | (C−0x7F) | DATA WITH LENGTH (C−0x7F) | 0x80  0x66 | 0x66 |
| FROM 0xC0 TO 0x7F | (C−0xBF) | DATA WITH LENGTH (C−0xBF) AFTER 1-BYTE "0x40" | 0xC0  0x77 | 0x40  0x77 |

FIG. 4

| ENCODED DATA | | A1 | A2 | A3 | ..... | Ai |
|---|---|---|---|---|---|---|
| OPERATED DATA | B0 | B1 = B0⊕A1⊕0x40 | B2 = B1⊕A2⊕0x40 | B3 = B2⊕A3⊕0x0 | ..... | Bi = Bi−1⊕Ai⊕0x40 |

FIG. 5

| LATCHED DATA | B0 | B1 | B2 | B3 | ..... | Bi |
|---|---|---|---|---|---|---|
| FIFO STORED DATA | | $C1 = B0 \oplus B1 \oplus 0x40$ $= A1$ | $C2 = B1 \oplus B2 \oplus 0x40$ $= A2$ | $C3 = B2 \oplus B3 \oplus 0x40$ $= A3$ | ..... | $Ci = Bi-1 \oplus Bi \oplus 0x40$ $= Ai$ |

FIG. 6

```
1.   int encode(unsigned char *src, unsigned char *dst, int size)
2.   {
3.       unsigned char *dsttop = dst ;
4.       unsigned char cmd ;
5.       int len ;
6.       while(size > 0) {
7.           if(size > 1 && *src = = *(src + 1)) {
8.               for(len = 2 ; len < 64 && len < size ; len + +) {
9.                   if(*src ! = *(src + len)) break ;
10.              }
11.              if(*src = = 0x40) {
12.                  *dst + + = len − 1 ;
13.              } else {
14.                  *dst + + = len + 0x3f ;
15.                  *dst + + =*src ;
16.              }
17.              src + = len ; size − = len ;
18.              continue ;
19.          }
20.          if(*src = = 0x40) {
21.              if(size= =1 | | size>2 && *(src+1) = =*(src+2) {
22.                  *dst + + = 0 ;
23.                  src + + ; size − − ;
24.                  continue ;
25.              }
26.              src + + ; size − − ;
27.              cmd = 0xdf ;
28.          } else {
29.              cmd = 0x7f ;
30.          }
31.          for(len = 1, len < 64 && len < size ; len + +) {
32.              if(* (src + len) = = 0x40) break ;
33.              if(len+2<size && *(src+len) = =*(src+len+1)){
34.                  if(* (src + len) = =*(src + len + 2)) break ;
35.              }
36.          }
37.          *dst + + = len + cmd ;
38.          size − = len ;
39.          while(len − −) *dst + + =*src + + ;
40.      }
41.      return dst − dsttop ;
42.  }
```

FIG. 7

```
1.  void operate(unsigned char *src, unsigned char *dst, int size)
2.  {
3.       *dst + + = 0x00 ;
4.       while(size - -) {
5.            *dst = *src^ * (dst - 1)^  0x40
6.            src + + ;  dst + + ;
7.       }
8.  }
```

COMMUNICATION CONTROL APPARATUS AND METHOD

BACKGROUND OF THE INVENTION

The present invention relates to a communication control apparatus and method which execute a data communication process via, e.g., a predetermined communication medium, and a storage medium that stores a computer readable program.

Conventionally, when a data transfer process is done via versatile parallel ports between various types of data processing apparatuses, it is a common practice to make asynchronous transfer, e.g., transfer based on handshake control using a control signal nStrobe and status signal Busy. With this scheme, the sender side confirms before transfer of each byte of data if the signal Busy is "L" (Low level). If the signal Busy is "L", the sender side outputs 1-byte data, and then outputs "L" as a control nStrobe signal. The receiver side confirms that the signal nStrobe goes "L", and then sets the signal Busy at "H" (High level) to receive data. Upon completion of data reception, the receiver side resets the signal Busy to "L".

Since a general personal computer cannot execute this handshake control by hardware, it executes that control by software and cannot transfer data at high speed.

To solve this problem, a method of implementing high-speed data transfer by hardware handshake control like ECP mode transfer specified by the IEEE standards "IEEE Std 1284-1994" is known.

However, since this method requires dedicated hardware, only a computer which comprises this hardware can transfer data at high speed.

Also, a method that allows high-speed transfer by obviating the need for handshake control in units of bytes using, as a clock bit, one fixed bit of 8-bit data transferred by a data transfer apparatus via a parallel port has been proposed.

However, since this method uses one bit as a clock bit, only 7 bits can be sent per transfer.

As described in Japanese Patent Laid-Open No. 9-505421, a data transfer method that uses an arbitrary bit as a clock bit without fixing the clock bit is also available. In this method, since the receiver side cannot generate any clock if successive byte data assume identical values, byte data having a fixed value is inserted between neighboring byte data having identical values.

In data which is runlength-encoded in units of bytes, length and data bytes appear at neighboring locations. For this reason, when neighboring byte data assume identical values as a result of encoding, the value of the length byte is decreased by unity. In this manner, since successive byte data are controlled not to have identical values, clocks are generated from data, thus allowing high-speed transfer.

However, in the former method, since fixed byte data is inserted to avoid byte data having identical values from being successively transferred, the size of data to be transferred increases. In the latter method, since the length byte value is decreased by unity, the compression ratio suffers. Also, in the latter method, since data of two successive bytes having identical values must be encoded to a repeat command, the compression ratio suffers. For example, a case will be examined below wherein 3-byte data "AAB" is runlength-encoded. In this case, when "AA" is encoded to a "code (1 byte) indicating a runlength=2+A", and "B" is encoded to a "code (1 byte) indicating raw data with unity length+B", source 3-byte data is converted into 4-byte codes. In this manner, when runlength encoding is simply applied, the compression ratio impairs. For this reason, it is a common practice to prevent the compression ratio from impairing by encoding "AA" as raw data in place of a repeat command. However, since the above method inhibits identical code bytes from successively appearing, a string "AA" must be runlength-encoded, and the compression ratio cannot be prevented from impairing.

SUMMARY OF THE INVENTION

The present invention has been made to solve the aforementioned problems, and has as its object to provide a communication control apparatus and method, in which the sender side encodes data to be sent so that a certain value does not successively appear and the encoded data has a size smaller than source data and then sends the encoded data, and the receiver side receives data while generating a clock signal from the received data signal, thus allowing high-speed data transfer, and preventing the data size to be transferred from increasing.

In order to achieve the above object, according to the present invention, the sender side encodes data not to generate encoded data having a predetermined value upon sending data, makes an arithmetic operation to prevent encoded data having identical values from successively appearing, and then sends encoded data. The receiver side generates a clock based on a change in received data value, and receives data in synchronism with that clock.

The present invention comprises the following arrangement. That is, an apparatus of the present invention comprises:

a parallel port having a plurality of data signal lines, at least one control signal line, and at least one status signal line;

clock generation means for generating a clock signal by detecting a change in arbitrary data signal at the parallel port;

a register for temporarily storing a data signal received via the parallel port when the clock generation means generates the clock signal;

an arithmetic device for making an arithmetic operation of data temporarily stored in the register before and after the clock signal is generated by the clock generation means, and outputting an operated result;

storage means for storing the operated result output from the arithmetic device; and reception ready status signal output means for outputting a reception ready status signal indicating whether or not the storage means has a predetermined free area onto the status or data signal line of the parallel port.

Alternatively, an apparatus of the present invention comprises:

a parallel port having a plurality of data signal lines, at least one control signal line, and at least one status signal line;

encoding means for generating encoded data not to include a predetermined value by analyzing source data to be externally transferred via the parallel port;

arithmetic means for making a predetermined arithmetic operation of the encoded data generated by the encoding means and outputting an operated result; and communication means for outputting data of the operated result output from the arithmetic means onto the data signal line of the parallel port when a reception ready status signal output from an apparatus connected to the parallel port indicates that it is ready to receive data having a predetermined size.

Alternatively, a communication control apparatus for sending data to a receiving apparatus for generating a reception clock in response to a change in data value via a parallel interface with a predetermined width, comprising:

encoding means for encoding parallel data to be sent not to include a specific value;

arithmetic means for making an arithmetic operation of the parallel data encoded by the encoding means with neighboring data having different values; and means for sending the data that have undergone the arithmetic operation of the arithmetic means via the parallel interface.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 shows an example of an encoding table generated by an encoding program shown in FIG. 2;

FIG. 4 is a table showing examples of codes generated by the encoding program shown in FIG. 2, and operated results output from an arithmetic operation program shown in FIG. 2;

FIG. 5 is a table showing examples of data latched by a latch circuit shown in FIG. 2, and operated results output therefrom after arithmetic operations;

FIG. 6 shows the encoding sequence of the encoding program shown in FIG. 2 in detail;

FIG. 7 shows the arithmetic operation sequence of the arithmetic operation program shown in FIG. 2;

DETAILED DESCRIPTION OF THE PREFERRED EMBODIMENTS

[First Embodiment]

Figure 1:
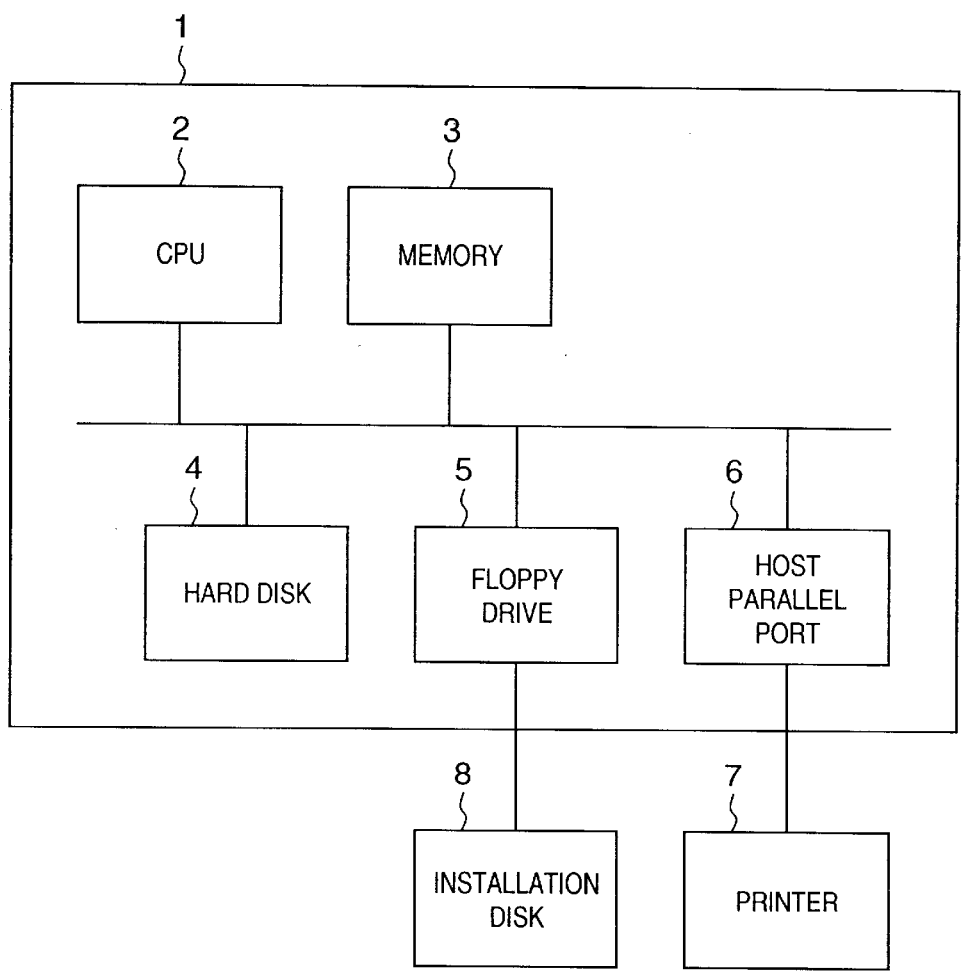
FIG. 1 is a block diagram for explaining the arrangement of a communication control apparatus according to the first embodiment of the present invention.

FIG. 1 is a block diagram showing a computer system that implements the communication control sequence according to the first embodiment of the present invention.

<System Arrangement>

Referring to FIG. 1, a host computer 1 comprises a CPU 2, memory 3, hard disk 4, floppy drive 5, and host parallel port 6, and is connected to a printer 7 via the host parallel port 6.

The CPU 2 executes various control programs and application programs stored in the memory 3. The memory 3 stores programs read out from the hard disk 4 or floppy drive 5, and data the readout programs require.

The hard disk 4 stores programs for implementing the communication control sequence according to the present invention, such as an operating system 10, application program (application) 11, printer driver program 12, encoding program 13, arithmetic operation program 14, communication program 15, and the like, which will be explained later with reference to FIG. 2. These program will be generally called a communication control program. In this embodiment, communications are made between the host computer 1 and printer 7.

The floppy drive 5 can load a floppy disk such as an installation disk 8 or the like, and reads programs stored in the loaded floppy disk. The host parallel port 6 sends data and control signals to the printer 7, and can receive status signals from the printer 7. The printer 7 receives the data and control signals from the host parallel port 6 to print data, and sends status signals indicating its various status data to the host parallel port 6.

Figure 2:
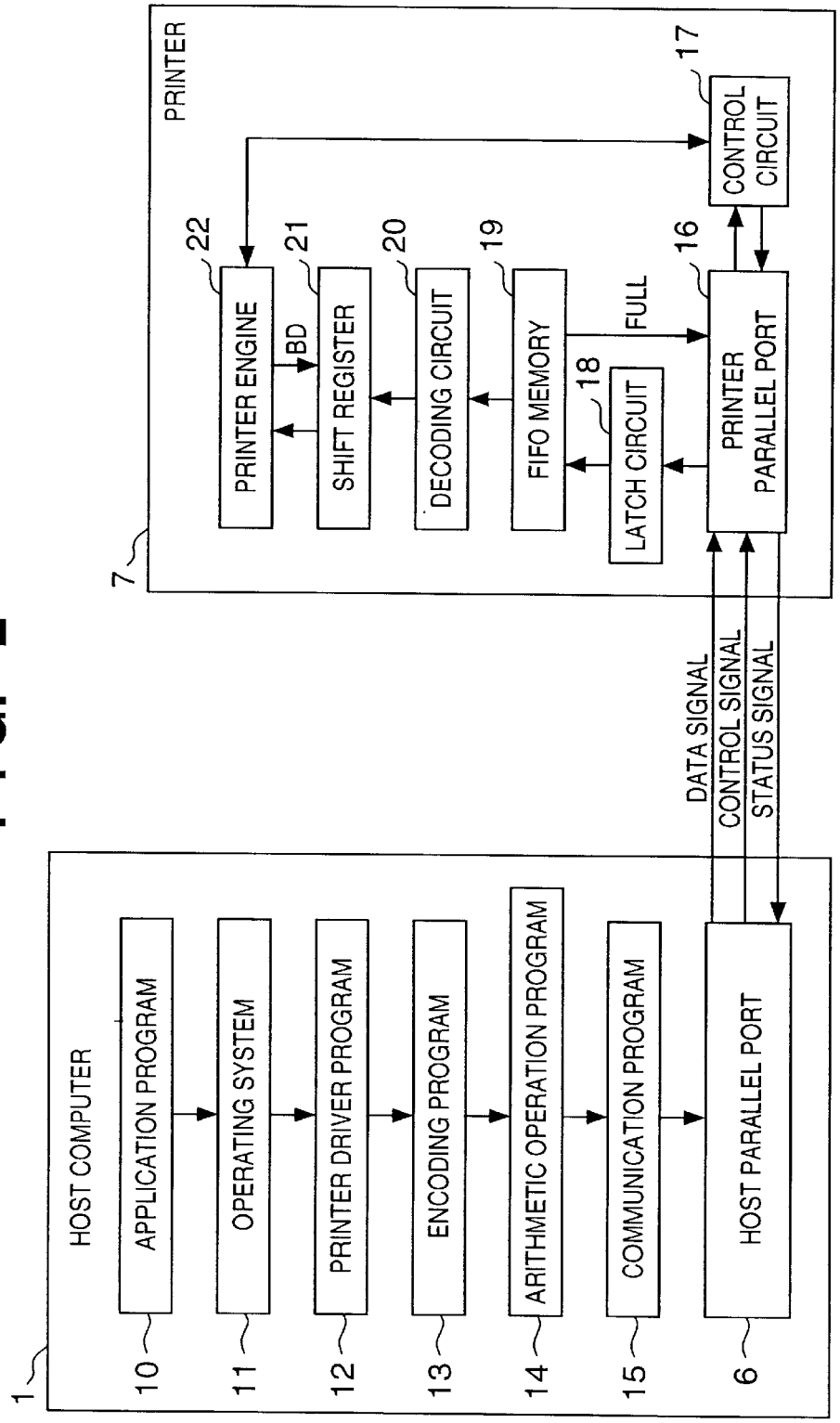
FIG. 2 is a block diagram showing the arrangement of a print system to which a communication control apparatus according to the present invention can be applied.

The installation disk 8 stores the printer driver program 12, encoding program 13, arithmetic operation program 14, and communication program 15, which are shown in FIG. 2 (to be described later), and an installation program.

In a normal installation process of the communication control program, when the operator sets the installation disk 8 in the floppy drive 5 (or a CD-ROM drive (not shown)), and launches the installation program, the installation program loads the printer driver program 12, encoding program 13, arithmetic operation program 14, and communication program 15 from the installation disk 8 and writes them on the hard disk 4.

Also, the installation program sets up the printer driver program 12 to be able to be used from the application 11 using functions provided by the operating system 10.

FIG. 2 is a block diagram showing the arrangement of a print system to which a communication control method according to the present invention can be applied.

In the host computer 1, the operating system (OS) 10 manages hardware resources such as the CPU 2, memory 3, hard disk 4, floppy drive 5, host parallel port 6, and the like, and software programs such as the application program 11, printer driver program 12, encoding program 13, arithmetic operation program 14, communication program 15, and the like.

The application program 11 generates print data in accordance with an operator instruction, and issues a print command to the printer driver program 12 via the operating system 10. The printer driver program 12 generates bitmap data to be printed by the printer 7 on the basis of the print command issued by the application program 11.

The encoding program 13 generates encoded data, which does not include byte data of a predetermined value, on the basis of the bitmap data generated by the printer driver program 12. The arithmetic operation program 14 makes an arithmetic operation of the encoded data generated by the encoding program 13, so as to prevent byte data having a certain value from successively appearing, and outputs the operated result data. The communication program 15 instructs the printer 7 to print, and outputs the operated result data output from the arithmetic operation program 14 to the printer 7.

The host parallel port 6 includes signal lines of 8-bit data signals Data1 to Data8, 4-bit control signals nStrobe, nAutoFd, nSelectIn, and nInit, and 5-bit status signals nAck, Busy, PError, Select, and nFault indicating the states of the printer 7, which are specified by the IEEE standards "IEEE Std 1284-1994", and is connected to a printer parallel port 16.

In the printer 7, the printer parallel port 16 is connected to the host parallel port 6 via the aforementioned signals.

A control circuit 17 comprises, e.g., a 1-chip CPU, controls the printer parallel port 16, and sends an engine command and receives engine status to/from a printer engine 222 using serial signals.

A latch circuit 18 generates a clock from a data signal upon receiving an encoded data sequence output from the communication program 15 to latch data, makes a predetermined arithmetic operation between the currently and previously latched data, and outputs an operated result.

A FIFO (first in, first out) memory 19 stores data output from the latch circuit 18, and outputs the stored data to a decoding circuit 20 in the FIFO order. The FIFO memory 19 also outputs a signal FULL indicating if the free space available is equal to or larger than 8 KB to the printer parallel port 16.

The decoding circuit 20 decodes the encoded data sequence stored in the FIFO memory 19, and outputs decoded data to a shift register 21.

The shift register 21 converts parallel data output from the decoding circuit 20 into serial data upon receiving a BD (Beam Detect) signal that informs the start of a main scan from the printer engine 22, and outputs the serial data to the printer engine 22.

The printer engine 22 is a laser beam printer engine, and receives an engine command and sends engine status from/to the control circuit 17 using serial signals. Upon receiving a PRINT command from the control circuit 17, the printer engine 22 starts a print process for one page, outputs to the shift register 21 a BD signal that informs the start of a main scan when a paper sheet has reached a predetermined position, and prints in accordance with serial data output from the shift register 21.

<Data Transfer Process>

The data transfer process in the print process will be explained below.

When the operator generates print data using the application program 11 on the host computer 1 side and instructs to print this data, the application program 11 passes a print command on to the printer driver program 12 via the operating system 10. The printer driver program 12 generates bitmap data on the basis of a print command issued by the application program 11.

The encoding program 13 generates encoded data which does not include predetermined byte data from the bitmap data generated by the printer driver program, on the basis of the encoding sequence to be described later. The arithmetic operation program 14 makes a predetermined arithmetic operation of the encoded data generated by the encoding program 13 to assure that two successive byte data have different values, and outputs operated result data. In the following description, "0xmn" indicates that value mn is a hexadecimal value.

The communication program 15 sends a command "0x01" that instructs to start the print process via the host parallel port 6. The control circuit 17 receives this command via the printer parallel port 16. When the received command is the command "0x01" that instructs to start the print process, the control circuit 17 sends a PRINT command to the printer engine 22. Upon receiving the PRINT command, the printer engine 22 starts the print process.

The communication program 15 then sends operated data generated by and output from the arithmetic operation program 14 via the host parallel port 6 on the basis of the communication sequence to be described later.

The latch circuit 18 receives that data via the printer parallel port 16, and latches data in response to a clock generated by detecting a change in data using a circuit to be described later. Also, the latch circuit 18 makes a predetermined arithmetic operation between the currently and previously latched data, and stores the operated result in the FIFO memory 19. Since the predetermined arithmetic operation made by the latch circuit is an inverse arithmetic operation to that made by the arithmetic operation program 14, data stored in the FIFO memory 19 is equal to the encoded data generated by the encoding program 13.

The decoding circuit 20 outputs the encoded data stored in the FIFO memory 10 to the shift register 21 on the basis of the decoding sequence to be described later. The shift register 21 has a counter for counting the main scan length. Every time the BD signal output from the printer engine 22 informs the start of a main scan, the shift register 21 sets a predetermined value in the counter, then converts parallel data output from the decoding circuit 20 at a predetermined timing into serial data, outputs the serial data to the printer engine 22, and decrements the counter value, while the counter value is larger than "0". When a paper sheet has reached a predetermined position, the printer engine 22 informs necessity of data output by outputting a BD signal every time a main scan starts, and prints on the basis of the serial data output from the shift register 21.

Codes to be generated by the encoding program 13 shown in FIG. 2 will be explained below with reference to the table shown in FIG. 3. In the following description of this specification, processing modules implemented upon executing the individual programs shown in FIG. 2 by the CPU 2 are also called programs. Note that codes used in this embodiment are a kind of runlength codes.

FIG. 3 shows an example of encoded data generated by the encoding program 13 shown in FIG. 2.

As shown in FIG. 3, when command code C assumes a value ranging from "0" to "0x3F", it is a command indicating a run of predetermined byte data "0x40", and designates to repeat "0x40" the number of times corresponding to the value of command code C. The number of repetitions is given by "C+1". For example, command code "0x01" designates two repetitions of "0x40", and expresses 2-byte data "0x40, 0x40". With this command, a run of predetermined byte data "0x40" can be encoded so that encoded data does not include any predetermined byte data "0x40".

When command code C assumes a value ranging from "0x41" to "0x7F", it is a repeat command of arbitrary data, and designates to repeat 1-byte data that follows this command code the number of times corresponding to the value of command code C. The number of repetitions is given by "C-0x3F". For example, command code "0x41, 0x55" expresses 2-byte data "0x55, 0x55".

When command code C assumes a value ranging from "0x80" to "0xBF", it is a raw data command, and designates that raw data having a length corresponding to the value of command code C follows the command. The length of raw data is given by "C-0x7F". For example, command code "0x80, 0x66" expresses "1-byte data "0x66".

When command code C assumes a value ranging from "0xC0" to "0xFF", it designates that raw data with a length corresponding to the value of command code C follows predetermined byte data "0x40". The length of raw data is given by "C-0xBF". For example, command code "0xC0, 0x77" expresses 2-byte data "0x40, 0x77". In this embodiment, raw data indicates data directly copied from data before encoding to encoded data.

With this command (from 0xC0 to 0xFF), even when predetermined byte data "0x40" appears in a data sequence to be encoded, that data sequence can be encoded without impairing the compression ratio and without including the predetermined byte data "0x40" in the encoded byte data. This value "0x40" is used in an arithmetic operation (to be described later) for generating transmission data. This arithmetic operation guarantees that successive encoded data do not have identical values.

For example, when a data sequence "0x3F, 0x40, 0x41" is runlength-encoded, it is a common practice to encode that sequence to a single command indicating 3-byte raw data, i.e., 4 bytes "a code indicating data length=3, 0x3F, 0x40, 0x41". However, in the encoding method of this embodiment, the predetermined byte data "0x40" cannot be included in encoded byte data. For this reason, if no command (command codes 0xC0 to 0xFF) indicating that data follows "0x40" is available, the aforementioned data sequence must be encoded to 5-byte codes "0x80 (a command indicating that raw data with 1-byte length follows), 0x3F (data), 0x00 (a command indicating one 0x40), 0x80 (a command indicating that raw data with 1-byte length follows), 0x41 (data)", thus impairing the compression ratio. However, using the command (command codes 0xC0 to 0xFF) indicating that data follows "0x40", the data sequence can be encoded to 4-byte codes "0x80 (a command indicating that raw data with 1-byte length follows), 0x3F (data), 0xC0 (a command indicating that raw data with unity length follows 0x40 with unity length), and 0x41 (data)", thus preventing the compression ratio from impairing.

Since the aforementioned encoding sequence has no restriction that inhibits successive byte data from having identical values, encoding can be efficiently done. Instead, the above encoding sequence suffers a restriction that inhibits encoded data from including byte data of a predetermined value. However, since source data normally has a nonuniform distribution, the compression ratio can be prevented from impairing by selecting a value which is included in source data at a smaller ratio as the predetermined value. The byte data of the predetermined value can be arbitrarily selected except for zero. Furthermore, using the command (from 0xC0 to 0x7F) that designates that raw data with a length corresponding to the command code value follows the byte data of the predetermined value, even when source data before compression includes the byte data of the predetermined value, the compression ratio can be prevented from impairing.

The arithmetic operation made by the arithmetic operation program 14 shown in FIG. 2 will be explained below with reference to FIG. 4. The upper row in FIG. 4 shows a series of encoded data "A1", A2", "A3", ..., "Ai", ... generated by the encoding program 13. Also, the lower row of FIG. 4 shows a series of operated data "B0", "B1", B2", B3", ..., "Bi", ... output from the arithmetic operation program 15.

As shown in FIG. 4, the arithmetic operation program 15 initially outputs arbitrary byte data "B0". Then, the program 15 sequentially EX-ORs previously output byte data "B(i−1)", encoded data "Ai", and predetermined byte data "0x40", and outputs the computation result. For example, operated data "B2" corresponding to encoded data "A2" is the EX-OR of previously output byte data "B1", encoded data "A2", and predetermined byte data "0x40". Note that symbol $\oplus$ in FIG. 4 indicates EX-ORing. Also, B(i) is the same as Bi.

Since encdded data "Ai" is encoded not to include predetermined byte data "0x40", "Ai" is not "0x40", and the EX-OR "Ai⊕0x40" of "Ai" and "0x40" assumes a value other than zero. For this reason, since operated data "Bi" output from the arithmetic operation program 15 is the EX-OR of "B(i−1)" and "Ai⊕0x40" having a value other than zero, it can always be data different from "B(i−1)", and neighboring operated data never have identical values.

The arithmetic operation made by the latch circuit 18 in the printer 7 shown in FIG. 2 will be explained below with reference to FIG. 5. The upper row in FIG. 5 shows a series of received data "B0", "B1", B2", B3", ..., "Bi", ... received and latched by the latch circuit 18. The series of received data are the same as the operated data output from the arithmetic operation program 14. The lower row in FIG. 5 shows a series of data "C1", "C2", "C3", ..., "Ci", ... output from the latch circuit and stored in the FIFO memory 19.

As shown in FIG. 5, the arithmetic operation program 14 initially latches first byte data "B0". Every time 1 byte is received, the program 14 sequentially EX-ORs previously latched byte data "B(i−1)", newly latched received data "Bi", and predetermined byte data "0x40", and outputs the computation result. For example, output data "C2" corresponding to received data "B2" is the EX-OR of previously latched byte data "B1", received data "B2", and predetermined byte data "0x40". More specifically, since "C2"= "B1⊕B2⊕0x40", and "B2"="B1⊕A2⊕0x40", as described above, "C2"="B1⊕B1⊕A2⊕0x40)⊕0x40"="(B1⊕B1) ⊕A2⊕(0x40⊕0x40)"="0x00⊕A2⊕0x00"="A2", thus obtaining output data equal to the corresponding encoded data. In this manner, the latch circuit 18 can obtain, from input data Bi, data Ci having the same value as encoded data Ai generated by the encoding program 13 in the host computer 1.

<Details of Encoding Sequence>

Figure 12:
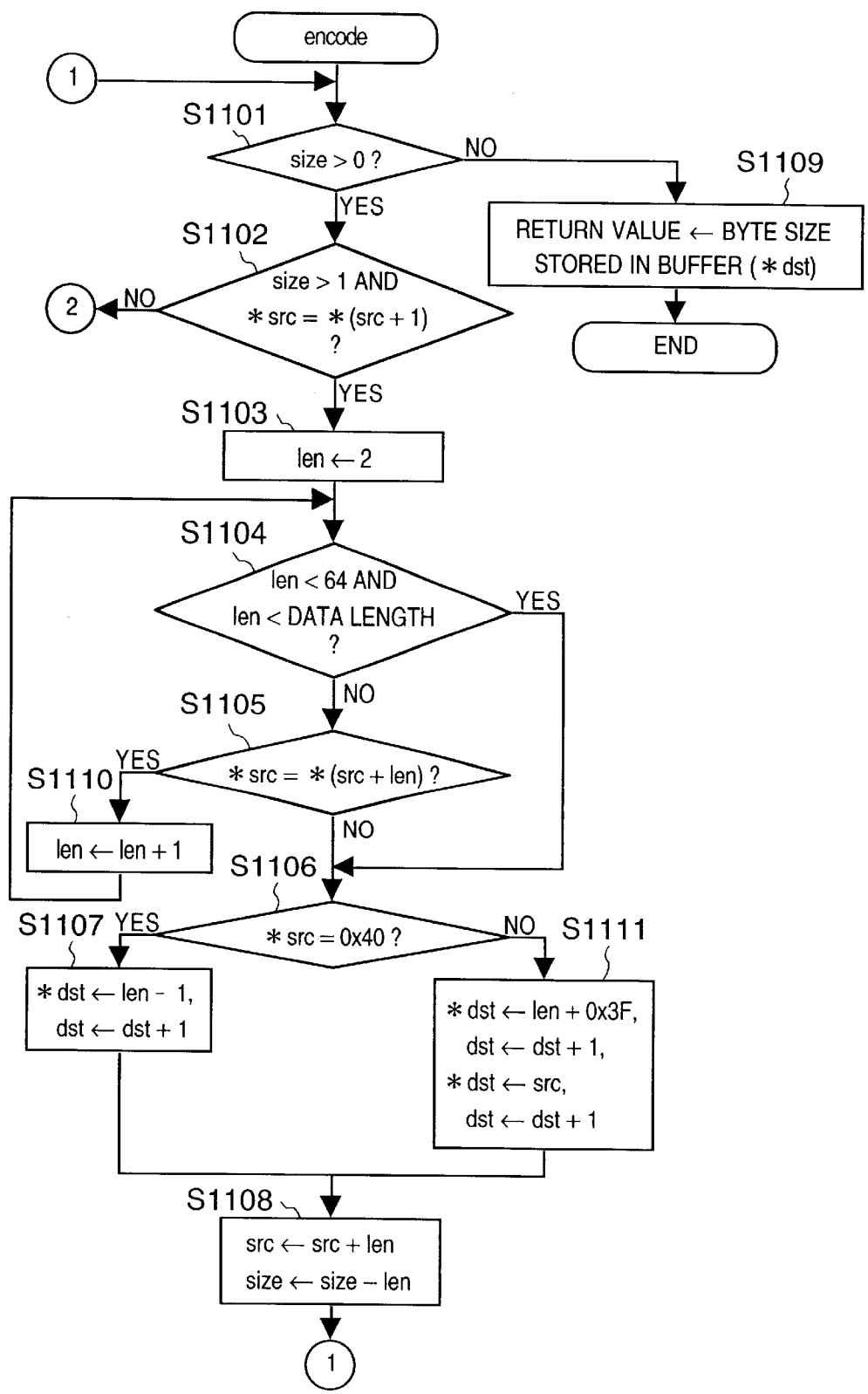
FIG. 12 is a flow chart showing the encoding sequence implemented by the encoding program.
Figure 13:
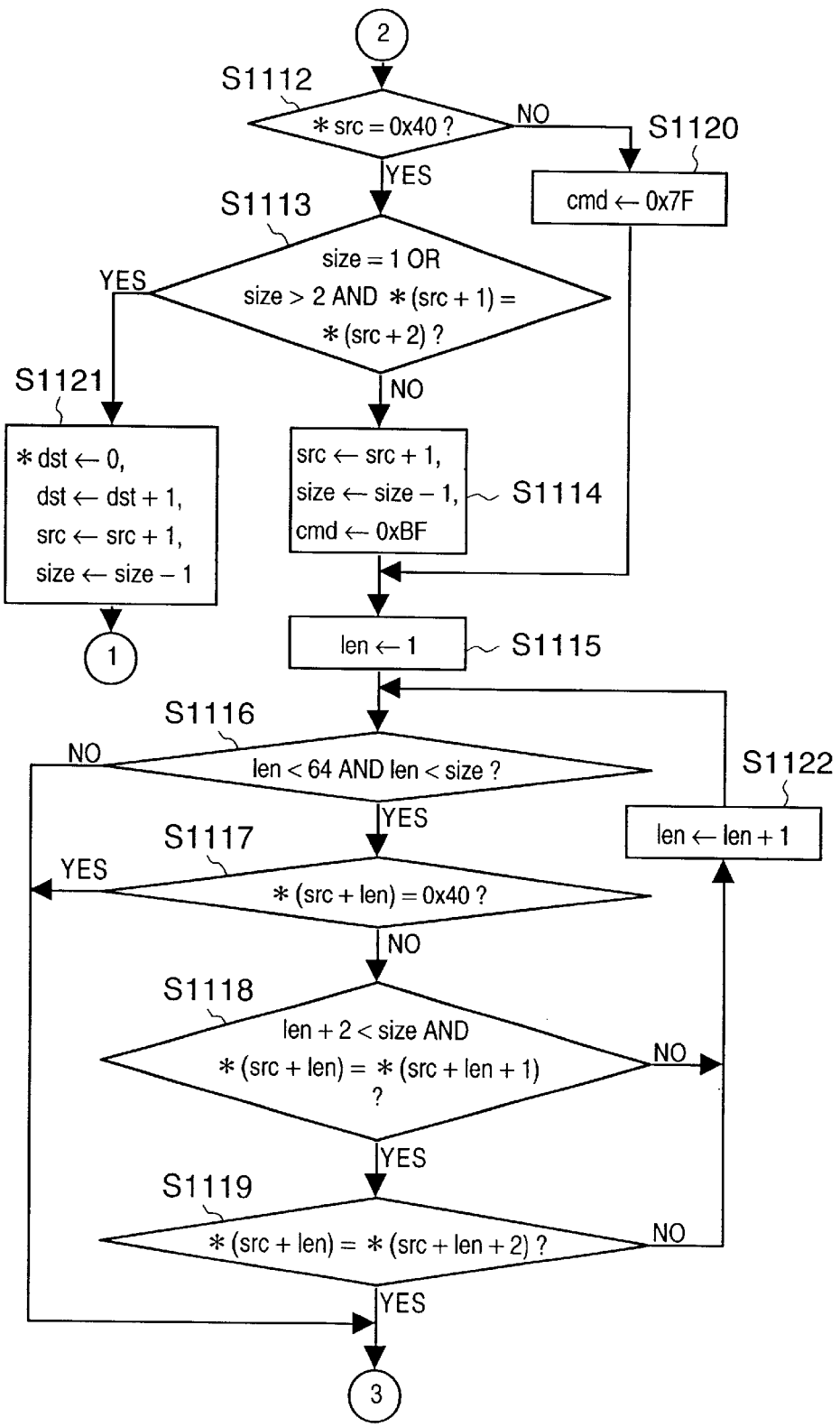
FIG. 13 is a flow chart showing the encoding sequence implemented by the encoding program.
Figure 14:
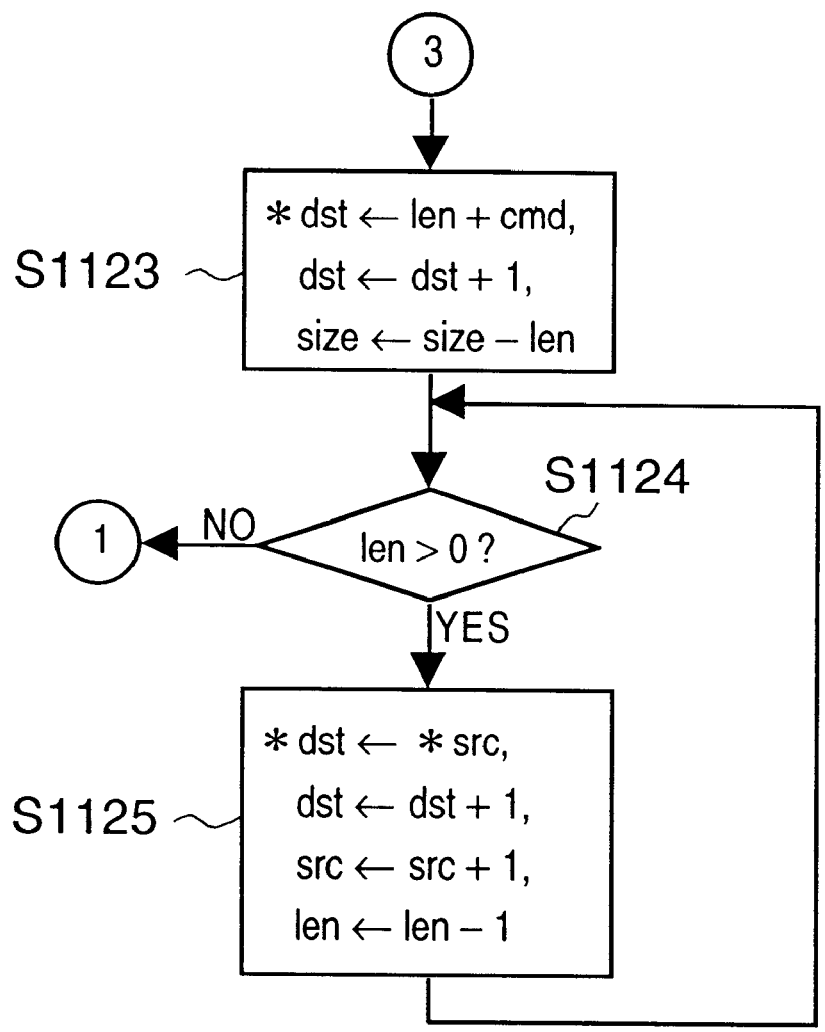
FIG. 14 is a flow chart showing the encoding sequence implemented by the encoding program.

The encoding sequence of the encoding program 13 will be described in detail below with reference to the program list shown in FIG. 6 and the flow charts shown in FIGS. 12 to 14.

FIG. 6 is a chart for explaining details of the encoding sequence of the encoding program 13 shown in FIG. 2, and shows a function described in C.

Referring to FIG. 6, line 1 defines a function name and types of arguments and a return value. The function name of this function is "encode", and the function receives the start address of bitmap data as pointer "src", the start address of a buffer that stores encoded data as pointer "dst", and the number of bytes of bitmap data as variable "size" from the caller of the function. The function then encodes bitmap data pointed by pointer "src", stores encoded data in the buffer pointed by pointer "dst", and returns the byte size stored in the buffer pointed by pointer "dst" as a return value. Note that expression "*x" indicates the contents (byte) at an address pointed by pointer x.

During the encoding process, start address "src", start address "dst", and byte size "size" are respectively updated to indicate the start address of unprocessed bitmap data, the start address of an unprocessed buffer, and the byte size of unprocessed bitmap data.

Lines 3 to 5 define temporary variables "dsttop", "cmd", and "len". Variable "dsttop" stores start address "dst" of a buffer that stores encoded data upon calling function encode. Variable "cmd" stores a command of a code, the process of which is underway. Variable "len" stores the length of raw data, the process of which is underway, or the runlength.

When function "encode" is called, the value of start address "dst" of the buffer is stored in "dsttop" in line 3, and a "while" loop from line 6 to line 40 is repeated until the number of bytes size of unprocessed bitmap data becomes zero. The "while" loop is a processing loop which is repeated as long as a condition is satisfied.

In the "while" loop from line 6 to line 40, it is checked in line 7 if byte size "size" of unprocessed bitmap data is larger than 1, and *src, i.e., the first byte of unprocessed bitmap data, and *(src+1), i.e., the next byte are identical data. If unprocessed data size is larger than 1 byte, and the first two bytes are identical data, since these bytes must be encoded to a repeat command, the runlength is computed by repeating a "for" loop from line 8 to line 10 until a maximum value 0x40=64 of the runlength or byte size "size" of unprocessed bitmap data is reached. The "for" loop is also a loop which is repeated as long as a condition is satisfied.

In the "for" loop, if it is determined in line 9 that *src, i.e., the first byte of unprocessed bitmap data, and *(src+len), i.e., the (len)-th byte of unprocessed bitmap data are not equal to each other, since identical data cease to appear successively, the "for" loop ends. At the end time of the "for" loop, variable "len" stores the runlength.

It is then checked in line 11 if *src, i.e., the first data of unprocessed bitmap data is 0x40. If *src=0x40, "len-1" as a command that indicates a run of 0x40 with length "len" is stored in a buffer pointed by pointer "dst" to increment pointer "dst" by 1 in line 12. If start data *src is not 0x40, "len+0x3f" as a command that indicates a run of arbitrary data with length "len" is stored in a buffer pointed by pointer "dst" to increment pointer "dst" by 1 in line 14, and *src as data which is repeated is stored in a buffer pointed by pointer "dst" to increment pointer "dst" by 1 in line 15. In either case, length "len" of run is added to start address "src" of unprocessed bitmap data, and length "len" of run is subtracted from byte size "size" of unprocessed bitmap data in line 17. By "continue" statement in line 18, the control returns to line 6 as the head of the "while" loop.

If it is determined in line 7 that byte size "size" of unprocessed bitmap data is 1 or *src, i.e., the first byte of unprocessed bitmap data, and *(src+1), i.e., the next byte, are not identical data, it is checked in line 20 if *src is 0x40. If *src is 0x40, the control advances to line 21 to check if byte size "size" of unprocessed bitmap data is 1 or "size" is larger than 2, and *(src+1), i.e., the byte next to 0x40, and *(src+2), i.e., the byte next to the next byte are equal to each other.

If byte size "size" of unprocessed bitmap data is 1, since no data follows that byte, the data must be encoded to a command indicating 0x40 with unity length. On the other hand, if "size" is larger than 2, and the two bytes next to 0x40 are identical, since it is advantageous to encode the identical 2-byte data to a command indicating a run, the data is also encoded to a command indicating 0x40 with unity length. In these two cases, the control advances to line 22, and zero as a command indicating a run of 0x40 with unity length is stored in a buffer pointed by pointer "dst" to increment "dst" by 1. In line 23, unity runlength is added to start address "src" of unprocessed bitmap data, and is subtracted from byte size "size" of unprocessed bitmap data. According to "continue" statement in line 24, the control returns to line 6 as the head of the "while" loop.

If it is determined in line 21 that byte size "size" of unprocessed bitmap data is 2 or two bytes next to 0x40 are not identical ones, the control jumps to line 26. In line 26, start address "src" of unprocessed bitmap data is incremented by 1 to process data next to 0x40, and byte size "size" of unprocessed bitmap data is decremented by 1. In line 27, 0xbf is stored in command code "cmd" to indicate that raw data follows 0x40 with unity length.

If it is determined in line 20 that *src is not 0x40, 0x7f is stored in command code "cmd" to indicate raw data in line 29.

In either case, the control advances to line 31, and the length of raw data is obtained by repeating a "for" loop from line 31 to line 36 until a maximum value (64) of the length of raw data or byte size "size" of unprocessed bitmap data is reached. In the "for" loop, if it is determined in line 32 that *(src+len) is 0x40, since that data cannot be included in raw data, the "for" loop ends. On the other hand, if it is determined in line 33 that the sum of length "len" of raw data and 2 is smaller than byte size "size" of unprocessed bitmap data, and *(src+len) equals *(src+len+1), i.e., identical data successively appear, it is further checked in line 34 if *(src+len) is equal to *(src+len+2). If the sum of length "len" of raw data and 2 is smaller than byte size "size" of unprocessed bitmap data, and *(src+len) is equal to *(src+len+1) and *(src+len+2), since three successive bytes have identical values, the "for" loop ends to encode that data as a repeat command. At the end time of the "for" loop, "len" stores the length of raw data.

In line 37, a command indicating that raw data follows 0x40 with unity length, or len+cmd as a command indicating raw data with length "len" is stored in a buffer pointed by pointer "dst", and "dst" is incremented by 1. In line 38, length "len" of run is subtracted from byte size "size" of unprocessed bitmap data.

In the "while" loop in line 39, raw data with a length indicated by length "len" is transferred from start address "src" of unprocessed bitmap data to start address "dst" of an unprocessed buffer, and start address "src" of unprocessed bitmap data and start address "dst" of an unprocessed buffer are incremented by the transferred byte size. The control then returns to line 6 as the head of the "while" loop.

Upon completion of processes for all data, if byte size "size" of unprocessed bitmap data becomes zero, the "while" loop from line 6 to line 40 ends, and the byte size stored in the buffer is computed by subtracting "dsttop", i.e., the start address of the buffer from "dst", i.e., the end address of the buffer in line 41, and the function ends by returning that value as a return value.

The arithmetic operation sequence of the arithmetic operation program 14 will be described in detail below with reference to the program list shown in FIG. 7.

FIG. 7 is a chart for explaining details of the arithmetic operation sequence of the arithmetic operation program 14 shown in FIG. 2, and also shows a function described in C.

Referring to FIG. 7, line 1 defines a function name and types of arguments and a return value. The function name of this function is "operate". The function receives start address "src" of encoded data, start address "dst" of a buffer that stores operated data, and byte size "size" of encoded data from the caller of this function, makes an arithmetic operation of encoded data, stores operated data, and returns no return value.

During the arithmetic operation process, start address "src", start address "dst", and byte size "size" are respectively updated to indicate the start address of unprocessed encoded data, the start address of an unprocessed buffer, and the byte size of unprocessed encoded data.

When function "operate" is called, 0x00 is stored as first arbitrary data in a buffer pointed by pointer "dst", to increment "dst" by 1 in line 3. The control advances to line 4 to repeat a "while" loop from line 4 to line 7 until byte size "size" of unprocessed encoded data becomes zero.

In the "while" loop from line 4 to line 7, the EX-OR of encoded data *src, previously output operated data *(dst−1), and predetermined byte data 0x40 is computed, and is stored in a buffer pointed by pointer "dst". In line 6, start addresses "src" and "dst" are incremented by 1, and byte size "size" of unprocessed encoded data is decremented by 1. Then, the control returns to line 4 as the head of the "while" loop.

Upon completion of processes for all data, if byte size "size" of unprocessed encoded data becomes zero, the "while" loop from line 4 to line 7 ends, thus ending the function.

<Description of Flow Charts>

The processes explained using FIGS. 6 and 7 will be explained again using the flow charts in FIGS. 12 to 16.

When function "encode" is called, it is checked in step S1101 if byte size "size" of unprocessed bitmap data is larger than 1. If YES in step S1101, the flow advances to step S1102; otherwise, the flow advances to step S1109.

It is checked in step S1102 if "size" is equal to or larger than 2, and *src, i.e., the first byte of unprocessed bitmap data, and *(src+1), i.e., the next byte are identical data. If the first two bytes are identical data, "2" is set in length "len" of run as an initial value (step S1103), and the runlength is obtained in steps S1104, S1105, and S1110. For this purpose, the value of variable "len" is incremented in unitary increments in step S1101 until it is determined in step S1104 that a maximum value (64) of the runlength or byte size "size" of unprocessed bitmap data is reached, or it is determined in step S1105 that *src, i.e., the first byte of unprocessed bitmap data, and *(src+len), i.e., the (len)-th byte of unprocessed bitmap data from the first byte become equal to each other. At the end time of this loop, "len" stores the runlength.

It is then checked in step S1106 if *src, i.e., the first byte of unprocessed bitmap data is 0x40. If YES in step S1106, since 0x40 is repeated, "len−1" as a command indicating a run of 0x40 with length "len" is stored in a buffer pointed by pointer "dst", and pointer "dst" is incremented by 1 in step S1107. On the other hand, if NO in step S1106, "len+0x3f" as a command indicating a run of data other than 0x40 with length "len" is stored in a buffer pointed by pointer "dst", pointer "dst" is incremented by 1, *src as data to be repeated is stored in *dst, i.e., a buffer pointed by pointer "dst", and pointer "dst" is incremented by 1 in step S1111.

In either case, length "len" of run is added to start address "src" of unprocessed bitmap data, and is subtracted from byte size "size" of unprocessed bitmap data, thus ending the process of the repeat portion. After that, the flow returns to step S1101.

On the other hand, if it is determined in step S1102 that byte size "size" of unprocessed bitmap data is "1" or *src, i.e., the first byte of unprocessed bitmap data, and *(src+1), i.e., the next byte are not identical data, the flow jumps to step S1112. It is checked in step S1112 if *src, i.e., the first byte of unprocessed bitmap data is 0x40. If YES in step S1112, the flow advances to step S1113 to check if byte size "size" of unprocessed bitmap data is 1, or "size" is equal to or larger than 3, and *(src+1), i.e., the byte next to 0x40, and *(src+2), i.e., the byte next to the next byte, are equal to each other.

If byte size "size" of unprocessed bitmap data is 1, since no data follows that byte, the data must be encoded to a command indicating 0x40 with unity length. On the other hand, if "size" is larger than 2, and the two bytes next to 0x40 are identical data, since it is advantageous to encode the identical 2-byte data to a command indicating a run, the data is also encoded to a command indicating 0x40 with unity length. In these two cases, the flow advances to step S1121. In step S1121, zero as a command indicating a run of 0x40 with unity length is stored in a buffer pointed by pointer "dst", pointers "dst" and "src" are respectively incremented by 1, and unity runlength if subtracted from byte size "size" of unprocessed bitmap data. After that, the flow returns to step S1101.

On the other hand, if it is determined in step S1113 that byte size "size" of unprocessed bitmap data is 2 or the two bytes next to 0x40 are not identical data, the flow advances to step S1114. In step S1114, to process data next to 0x40, start address "src" of unprocessed bitmap data is incremented by 1, byte size "size" of unprocessed bitmap data is decremented by 1, and command "0xbf" indicating that raw data follows 0x40 with unity length is stored in variable "cmd".

If it is determined in step S1112 that *src, i.e., the first byte of unprocessed bitmap data is not 0x40, command "0x7f" indicating that raw data follows is stored in variable "cmd" in step S1120.

In either case, the flow advances to step S1115, 1 is set as an initial value in variable "len". After that, it is checked in step S1116 if the maximum value (64) of the length of data that follows command 0x7f or 0xbf is reached or all bitmap data are processed. If neither of these conditions are satisfied, the length of data that follows the command is obtained in steps S1117 to S1119 and step S1122.

It is checked in step S1117 if *(src+len), i.e., the (len)-th byte of unprocessed bitmap data from the first byte is 0x40. If YES in step S1117, since that data cannot be included in encoded data, the loop ends here to temporarily divide data. If it is determined in step S1118 that the sum of length "len" of raw data and 2 is smaller than byte size "size" of unprocessed bitmap data, and *(src+len), i.e., the (len)-th byte of unprocessed bitmap data from the first byte is equal to *(src+len+1), i.e., the next byte, it is also checked in step S1119 if *(src+len) is equal to *(src+len+2). If the condition of either step S1118 or S1119 is not satisfied, "len" is incremented by 1 in step S1122 to repeat the process from step S1116.

If the conditions of both steps S1118 and S1119 are satisfied, the sum of length "len" of raw data and 2 is smaller than byte size "size" of unprocessed bitmap data, the value *(src+len) is equal to the values *(src+len+1) and *(src+len+2), and three successive bytes have identical values. For this reason, the flow advances to step S1123 to encode this data as a repeat command of data. When the flow has reached step S1112, variable "len" stores the length of raw data.

In step S1123, "len+cmd" as a command indicating raw data follows 0x40 with unity length or raw data with length "len" is stored in a buffer pointed by pointer "dst", and pointer "dst" is incremented by 1. Also, length "len" of run is subtracted from byte size "size" of unprocessed bitmap data.

In steps S1124 and S1125, raw data with a length indicated by length "len" is transferred from a buffer pointed by start address "src" of unprocessed bitmap data to a buffer pointed by pointer "dst" while incrementing start addresses "src" and "dst" by 1, and decrementing length "len" by 1. Upon completion of transfer of length "len", the flow returns to step S1101.

If it is determined in step S1101 that "size" is equal to or smaller than zero, i.e., if all data have been processed, and byte size "size" of unprocessed bitmap data becomes zero, the byte size stored in a buffer pointed by pointer "src" is computed in step S1109, and is returned as a return value, thus ending function "encode".

With the above-mentioned sequence, source data (raw data) can be converted into encoded data that does not include 0x40.

The arithmetic operation sequence of the arithmetic operation program 14 will be described in detail below with reference to the flow chart shown in FIG. 15.

Figure 15:
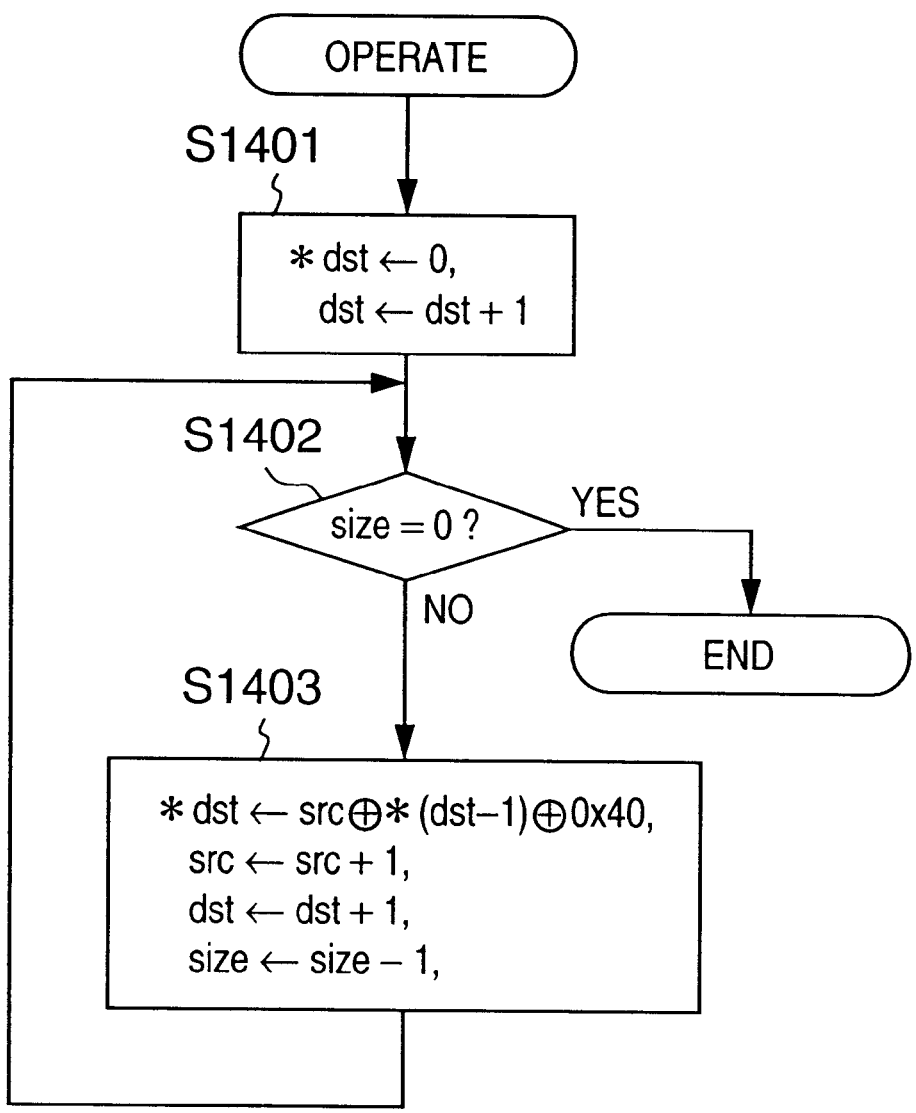
FIG. 15 is a flow chart showing the arithmetic processing sequence of encoded data by the arithmetic operation program.

FIG. 15 is a flow chart for explaining the arithmetic operation sequence of the arithmetic operation program 14 shown in FIGS. 2 and 7 in detail.

Referring to FIG. 15, function "operate" is given, as arguments, the address of encoded data, that of a buffer for storing operated data, and the length of encoded data, which are respectively passed on to pointer "src", pointer "dst", and variable "size".

In step S1401, 0x00 is stored as first data in a buffer pointed by pointer "dst", and pointer "dst" is incremented by 1. In this case, 0x00 is used as the first data, but its value is not particularly limited. The flow then advances to step S1402 to repeat step S1403 until byte size "size" of unprocessed encoded data becomes zero.

In step S1403, the EX-OR of encoded data *src, previously output operated data *(dst−1), and predetermined byte data 0x40 is computed, and is stored in a buffer pointed by pointer "dst". Then, pointers "src" and "dst" are incremented by 1, and byte size "size" of unprocessed encoded data is decremented by 1.

Upon completion of the processing of all data, if byte size "size" of unprocessed encoded data has become zero, the function ends.

The aforementioned sequence can guarantee that successive encoded data do not assume identical values. In the sequence shown in FIGS. 12 to 15, by changing constant 0x40 to a desired value other than zero, encoded data which does not include that desired value is generated, and it can be guaranteed using the desired value that two successive byte do not have identical values.

<Communication Processing Sequence>

The data communication processing sequence between the host computer 1 and printer 7 shown in FIG. 2 will be explained below with reference to FIG. 8.

Figure 8:
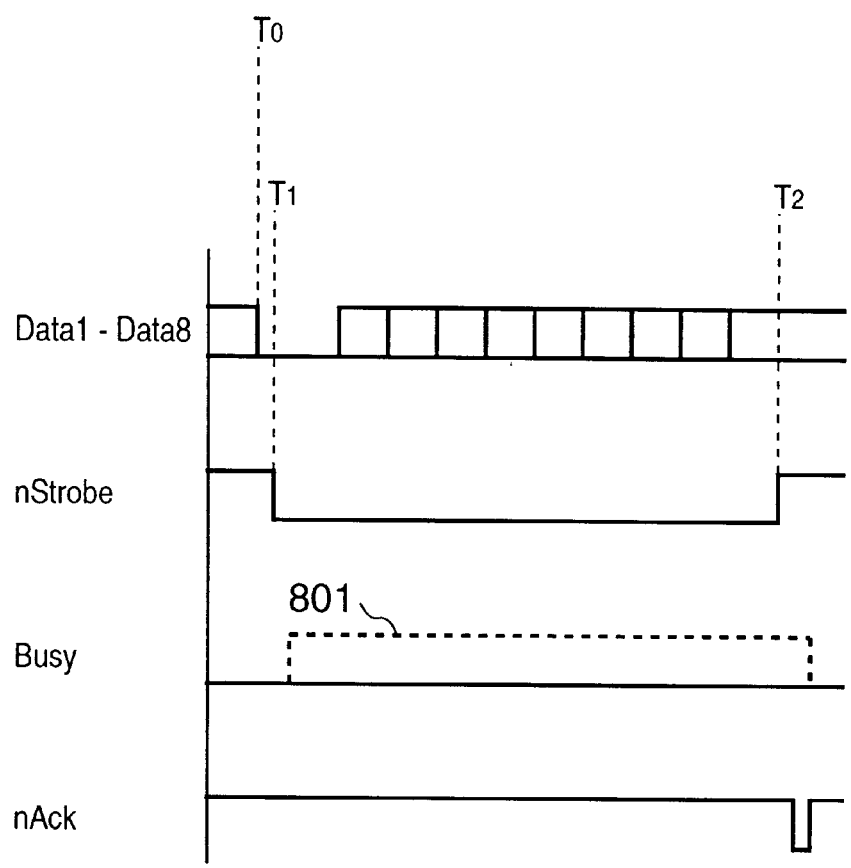
FIG. 8 is a timing chart for explaining a data communication process between a host computer and printer shown in FIG. 2.

FIG. 8 is a timing chart showing the data communication processing between the host computer 1 and printer 7 shown in FIG. 2.

Referring to FIG. 8, upon receiving, from the arithmetic operation program 14, an operated data sequence that has undergone arithmetic operations so that neighboring byte data do not assume identical values, the communication program 15 outputs the first byte "0x00" of the operated data sequence to the host parallel port 6 at timing T0, and then outputs "L" as the control signal nStrobe at timing T1.

Upon detecting the trailing edge of the control signal nStrobe, the printer parallel port 16 receives data output from the host computer. When the received data is command "0x00" indicating the start of transmission of the operated data sequence, if the FIFO memory 19 has a free space equal to or larger than 8 KB as the maximum value of the transfer block size, the status signal Busy is maintained "L"; otherwise, "H" is output as the status signal Busy within 0.5 $\mu$sec, as indicated by a dotted line 801 in FIG. 8.

The communication program 15 waits for 1 $\mu$sec or longer after it output "L" as the control signal nStrobe, and then reads the status signal Busy. If the status signal Busy is "H", since the FIFO memory 19 of the printer does not have any free space equal to or larger than 8 KB as the maximum value of the transfer block size, the program 15 waits until the status signal Busy changes to "L". On the other hand, when the status signal Busy is "H", the communication program 15 can cancel the start of transmission of the operated data sequence by resetting the control signal nStrobe to "H". When a free space equal to or larger than 8 KB as the maximum value of the transfer block size is available in the FIFO memory 19 before the communication program 15 resets the control signal nStrobe to "H", the printer parallel port 16 outputs "L" as the status signal Busy.

Upon detecting the status signal Busy="L", the communication program 15 of the host computer sends operated data in turn in units of bytes at intervals of 1 $\mu$sec or more within the range that does not exceed 8 KB as the maximum value of the transfer block size. At this time, since only the data signal is changed without changing the control signal, data can be set at very high speed. Note that the data cycle is restricted by circuit delays, blunting of the signal, or the like, but is not limited to 1 $\mu$sec within such restriction. When this data sending cycle is changed, the interval between the signals nStrobe and Busy, and the delay times of a system clock SCLK, clock signal, and the like (to be described later) are changed accordingly.

The operated data is supplied to the latch circuit 18 via the printer parallel port 16. The latch circuit 18 latches data when the control nStrobe signal has changed to "L". Also, upon detecting a change in any bit of an 8-bit data signal, the latch circuit 18 generates a clock, and latches data in synchronism with that clock. Since the leading and trailing times of a data signal are normally different, if data is immediately latched upon detecting a change in data signal, wrong data may be latched. To avoid this, data is latched 0.5 $\mu$sec after detection of a change in data signal. The data latched by the latch circuit 18 undergoes the predetermined arithmetic operation mentioned above, and is then written in the FIFO memory 19.

Upon completion of transfer of data for one block, the communication program 15 resets the control signal nStrobe to "H" at timing T2. In response to this signal, the printer parallel port 16 sets a status signal nAck at "L" for a predetermined period of time, and then resets it to "H", and also outputs "L" if the status signal Busy is "H".

<Reproduction of Encoded Data and Generation of Clock>

The arrangement and operation of the latch circuit 18 will be described in detail below with reference to FIG. 9.

Figure 9:
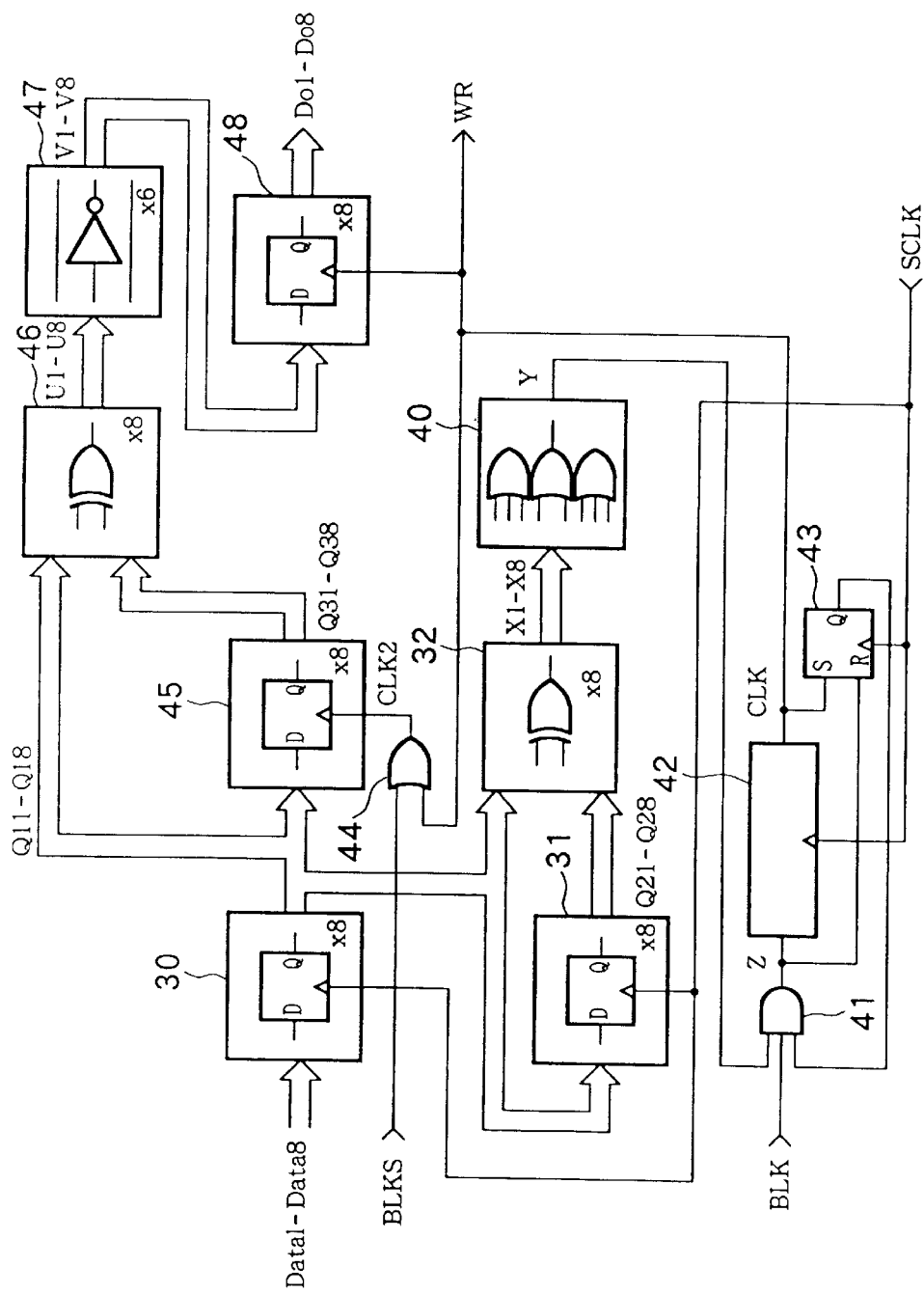
FIG. 9 is a circuit diagram showing details of the latch circuit shown in FIG. 2.

FIG. 9 is a circuit diagram showing details of the latch circuit 18 shown in FIG. 2.

Referring to FIG. 9, a flip-flop 30 is an 8-bit D flip-flop, which samples and latches data signals Data1 to Data8 supplied to its input in response to the leading edge of a system clock SCLK having a period sufficiently shorter than the data switching period of the sender side (e.g., 0.1-$\mu$sec period), and outputs them as signals Q11 to Q18.

A flip-flop 31 is an 8-bit D flip-flop, which samples and latches the signals Q11 to Q18 supplied to its input in response to the leading edge of the system clock SCLK, and outputs them as signals Q21 to Q28.

A gate 32 is an EX-OR gate having 2 inputs×8 gates, which computes the EX-ORs of the output signals Q11 to Q18 from the 8-bit D flip-flop 30, and the output signals Q21 to Q28 from the 8-bit D flip-flops 31 in units of digits, and outputs operated results as signals X1 to X8.

A gate 40 is an 8-input OR gate, which computes the OR of the output signals X1 to X8 from the EX-OR gate 32, and outputs the operated result as a signal Y. A gate 41 is an AND gate, which computes the AND of a signal BLK which is supplied from the printer parallel port 16 and indicates that reception of a code sequence is underway, the signal Y, and the Q output from an SR flip-flop 43, and outputs the operated result as a signal Z.

A shift register 42 delays the signal Z by, e.g., 0.5 μsec, and outputs the delayed signal as a clock CLK. The clock CLK is also supplied to the FIFO memory 19 as a write signal WR. In this manner, the generation timing of the clock signal CLK is delayed 0.5 μsec from a change in data signal.

A flip-flop 43 is an SR flip-flop, which samples the signals Z and CLK in response to the leading edge of the signal SCLK, and sets the Q output at "L" if the sampled signal Z is "H", or "H" if the sampled signal CLK is "H". Note that the output from the SR flip-flop 43 is set at "H" in a default state.

A gate 44 is an OR gate, which computes the OR of a signal BLKS which indicates the start of reception of a code sequence supplied from the printer parallel port 16, and the clock CLK, and outputs the operated result as a clock CLK2. Note that the signal BLKS is supplied as a one-shot pulse at the beginning of a reception of a code sequence.

A flip-flop 45 is an 8-bit D flip-flop, which samples and latches the signals Q11 to Q18 supplied to its input in response to the leading edge of the clock CLK2, and outputs them as signals Q31 to Q38.

A gate 46 is an EX-OR gate having 2 inputs×8 gates, which computes the EX-ORs of the signals Q11 to Q18, and the signals Q31 to Q38, and outputs their operated results as signals U1 to U8. That is, the gate 46 computes the EX-ORs of successive 2-byte data, and outputs them as the signals U1 to U8.

A gate 47 is an 8-input inverter, which inverts the signal U7 supplied to its input and outputs it as a signal V7, and also directly outputs the signals U1 to U6 and U8 supplied to its input as signals V1 to V6 and V8. That is, the gate 47 outputs the EX-ORs of the signals U1 to U8 and 0x40 as the signals V1 to V8.

A flip-flop 48 is an 8-bit D flip-flop, which samples and latches the signals V1 to V8 supplied to its input in response to the leading edge of the clock signal CLK, and outputs them as output signals Do1 to Do8. Note that the output signals Do1 to Do8 are supplied to the FIFO memory 19.

An example of the operation of the latch circuit 18 shown in FIG. 9 will be explained below with reference to FIGS. 10 and 11.

Figure 10:
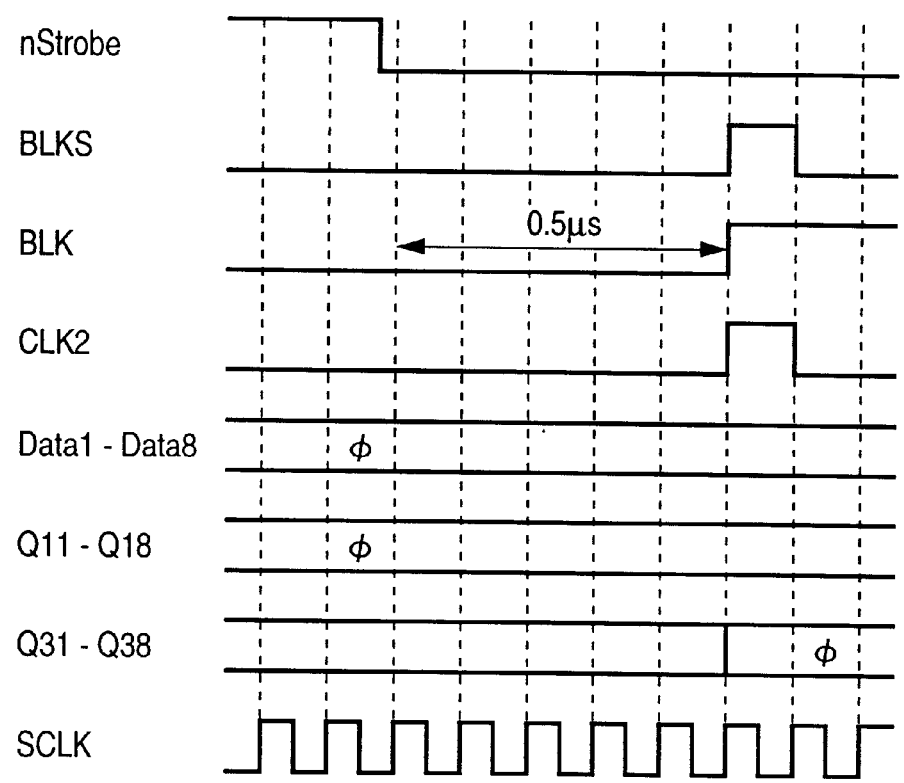
FIG. 10 is a timing chart showing the operation of the latch circuit shown in FIG. 9.

FIG. 10 is a timing chart showing the operation of the latch circuit 18 shown in FIG. 9, when the host computer changes the control signal nStrobe from "H" to "L". In FIG. 10, one scale mark indicated by the dotted line indicates 0.1 μsec, i.e., one cycle of the system clock signal SCLK.

Referring to FIG. 10, when the control signal nStrobe has changed from "H" to "L", the printer parallel port 16 detects this change in synchronism with the next leading edge of the system clock SCLK, and receives a data signal output from the host computer. When the received data signal is command "0x00" indicating the start of transmission of an operated data sequence, and a free space equal to or larger than 8 KB as the maximum value of the transfer block size is available in the FIFO memory 19, the signal BLK is set at "H" 0.5 μsec after the reception of the data signal, and the signal BLKS is set at "H" for only 0.1 μsec and is then reset to "L".

On the other hand, while the signal BLK is "L", the signal Z as the AND of the signals Y, BLK, and Q is set at "L", and the signal CLK obtained by delaying the signal Z by 0.5 μsec does not change to "H" before 0.5 μsec elapse after a change in signal BLK from "L" to "H". Hence, the same signal as the signal BLKS is output as the signal CLK2 as the OR of the signals BLKS and CLK.

When the signal CLK2 rises in response to the leading edge of the signal BLKS, the D flip-flop 45 samples and latches the signals Q11 to Q18 supplied to its input in response to the leading edge of the clock signal CLK2, and outputs them as the signals Q31 to Q38. The data signals Data1 to Data8 hold command "0x00" indicating the start of transmission of the operated data sequence during this interval, and the signals Q11 to Q18 which are obtained by sampling and latching the data signals Data1 to Data8 in response to the leading edge of the system clock SCLK also hold "0x00". For this reason, this value is latched and is output as the signals Q31 to Q38.

Figure 11:
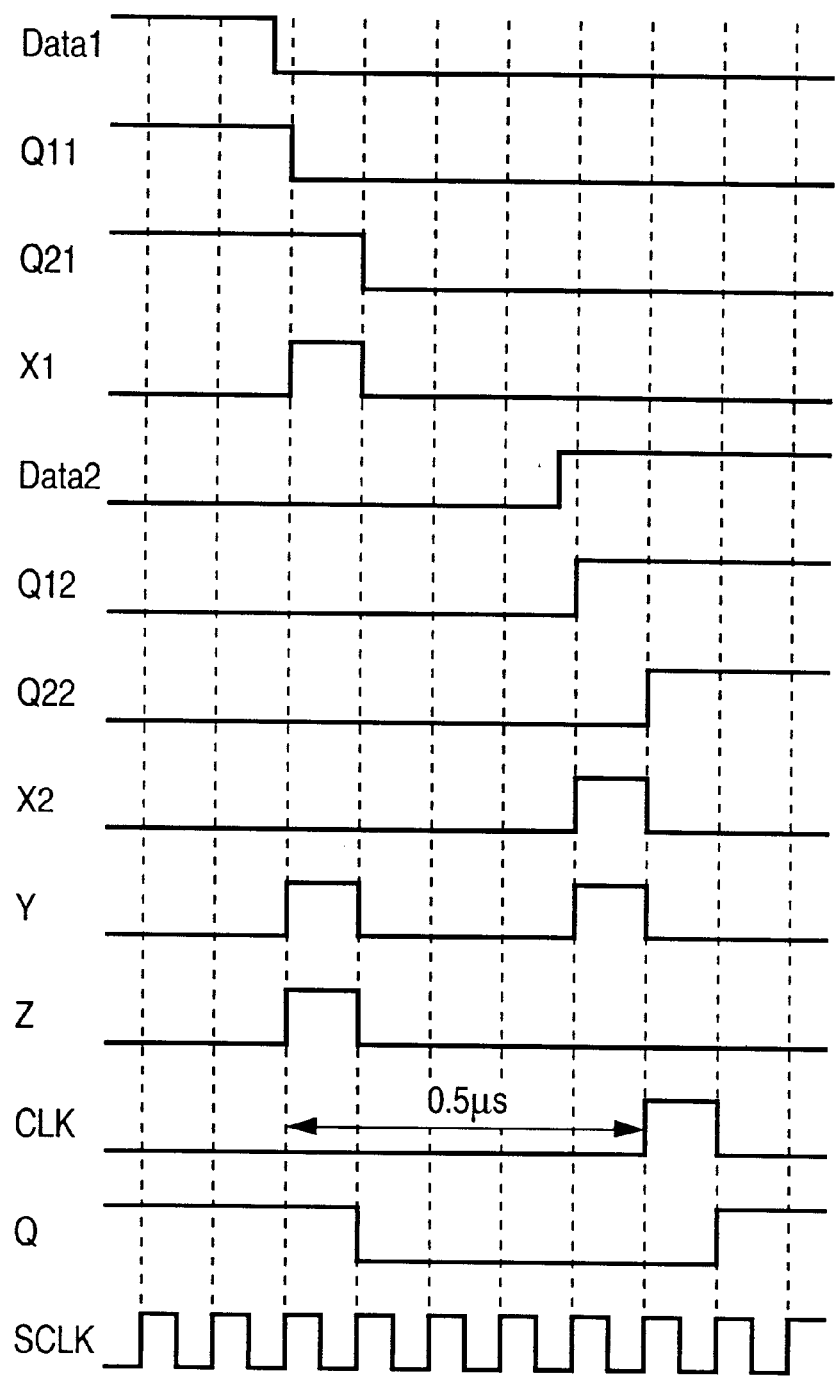
FIG. 11 is a timing chart showing the operation of the latch circuit shown in FIG. 9.

FIG. 11 is a timing chart showing the operation of the latch circuit 18 shown in FIG. 9 when the host computer has changed a data signal.

Referring to FIG. 11, when the data signal Data1 has changed from "H" to "L", the output signal Q11 from the D flip-flop 30 changes from "H" to "L" in synchronism with the next leading edge of the system clock SCLK. Also, the output signal Q21 from the D flip-flop 31 changes from "H" to "L" in synchronism with the second next leading edge of the system clock SCLK. The output signal X1 from the gate 32 goes "H" during an interval from when the signal Q11 changes to "L" until the signal Q21 changes to "L". Likewise, when the data signal Data2 has changed from "L" to "H" to have a delay from a change in data signal Data1 due to the difference between the leading and trailing edge timings, the output signal Q12 from the D flip-flop 30 changes from "L" to "H" in synchronism with the next leading edge of the system clock SCLK. Also, the output Q22 from the D flip-flop 31 changes from "L" to "H" in synchronism with the second next leading edge of the system clock SCLK. The output signal X2 from the gate 32 goes "H" during an interval from when the signal Q12 changes to "H" until the signal Q21 changes to "H". In response to such changes, the signal Y goes "H" while either the signal X1 or X2 is "H".

If the signal BLK indicating that reception of a code sequence is underway is "H", since the first Q output of the SR flip-flop 43 is "H", the output signal Z from the AND gate 41 changes to "H" in response to changes in signals X1 and Y to "H". When the signal Z has changed to "H", the Q output from the SR flip-flop 43 changes to "L" in synchronism with the next leading edge of the system clock SCLK.

When the Q output from the SR flip-flop 43 has changed to "L", the output signal Z from the AND gate 41 changes to "L" irrespective of the status of the output signal Y of the OR gate 40, and maintains "L" even when the signals X2 and Y change to "H". When the clock CLK has changed from "L" to "H" 0.5 μsec after the change in signal Z by the shift register 42, the output signal CLK2 from the OR gate 44 also changes from "L" to "H", and the D flip-flop 45 latches the input signals Q11 to Q18 and output them as the signals Q31 to Q38.

When the clock signal CLK has changed from "L" to "H", the D flip-flop 48 latches the input signals V1 to V8 and outputs them as the output signals Do1 to Do8 to supply them to the FIFO memory 19.

Furthermore, the Q output from the SR flip-flop 43 changes to "H" in synchronism with the next leading edge of the system clock SCLK. Since the clock CLK changes from "H" to "L" 0.5 μsec after the change in signal Z, the original state is restored, thus completing preparation for detection of changes in next data signal.

Immediately before the clock signal changes from "L" to "H", the received data latched by the D flip-flop 45 are output as the output signals Q31 to Q38 from the D flip-flop 45, and the received data to be latched by the D flip-flop 45 are output as the output signals Q11 to Q18 from the D flip-flop 30. Hence, the EX-ORs of two successive bytes included in the received data are output as the output signals U1 to U8 from the EX-OR gate 46. Also, data obtained by inverting only the signal U7 of the input signals U1 to U8, i.e., the EX-ORs of the signals U1 to U8 and the fixed value "0x40" are output as the output signals V1 to V8 from the inverter 47. Hence, data latched by and output from the D flip-flop 48 when the clock CLK changes from "L" to "H" are "previously input 1-byte data" ⊕ "currently input 1-byte data" ⊕ "0x40", and are stored in the FIFO memory 19.

A case has been explained wherein the data signal Data1 initially changes from "H" to "L". However, the same applies even when the data signal Data1 changes from "L" to "H" or a data signal other than the data signal Data1 changes. For this reason, when one of data signals changes, that change is detected, and the clock CLK can be generated.

<Decoding Processing Sequence>

Figure 16:
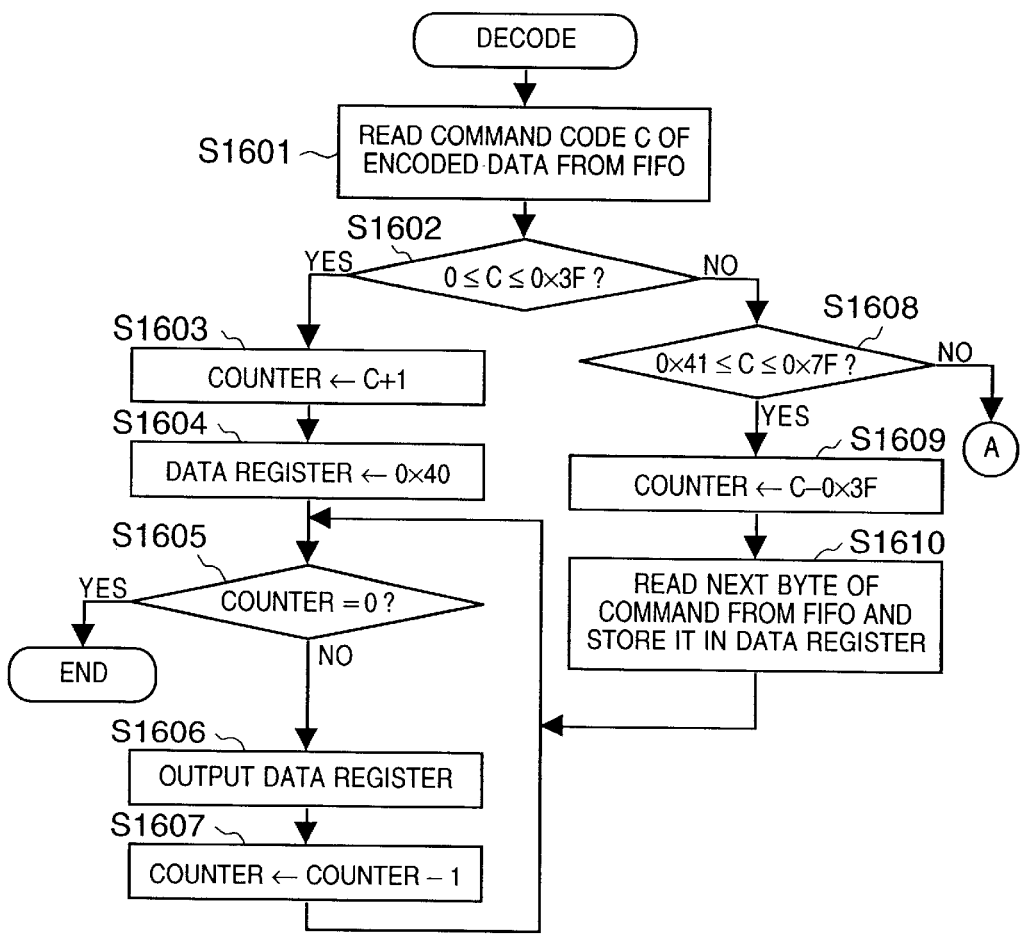
FIG. 16 is a flow chart showing the decoding process by a decoding circuit.
Figure 17:
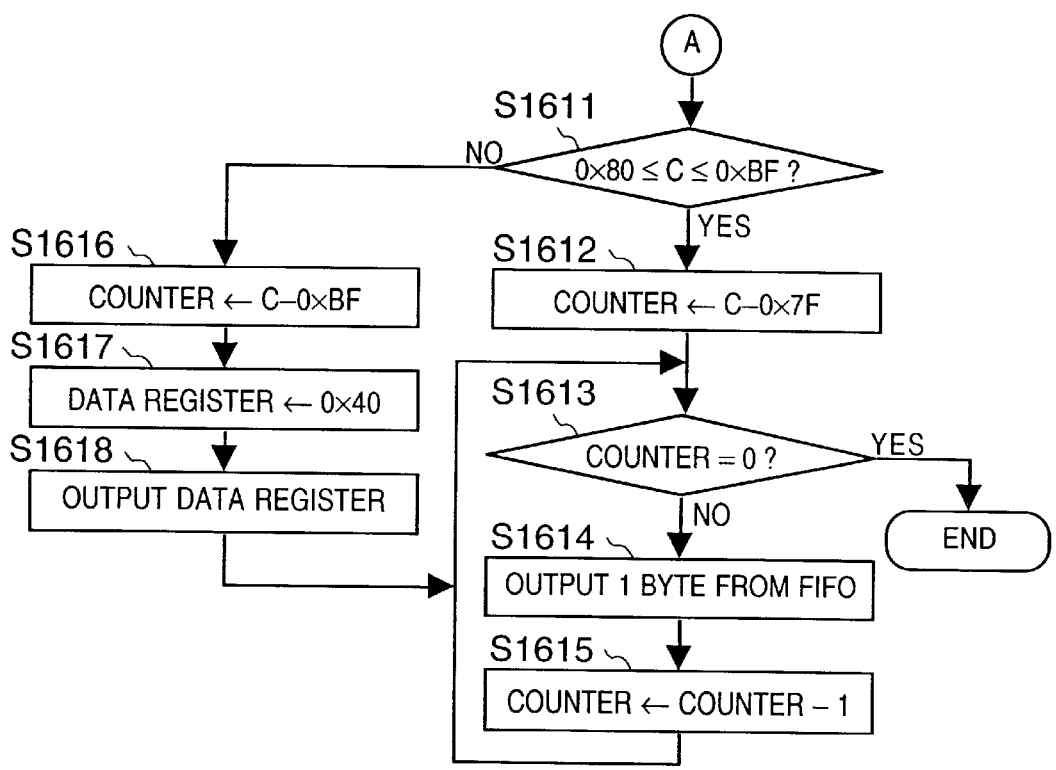
FIG. 17 is a flow chart showing the decoding process by a decoding circuit.

The decoding sequence of the decoding circuit 20 shown in FIG. 2 will be explained in detail below with reference to FIGS. 16 and 17.

When data is requested from the shift register 21, the decoding circuit 20 reads a command of 1-byte encoded data from the FIFO memory 19 (step S1601). If command code C assumes a value ranging from "0x00" to "0x3F", i.e., indicates "(C+1) repetitions of 0x40" (YES in step S1602), the decoding circuit 20 computes the runlength based on command code C and sets it in a counter (step S1603), and stores "0x40" in a data register (step S1604). After that, while the value of the counter is larger than "0", the decoding circuit 20 outputs the data stored in the data register every time data is requested from the shift register 21, and decrements the value of the counter by "1" (steps S1605 to S1607).

If command code C assumes a value ranging from "0x41" to "0x7F", i.e., "(C-0x3f) repetitions of following 1-byte data" (YES in step S1608), the decoding circuit 20 computes the runlength based on command code C and sets it in the counter (step S1609), and reads the next 1-byte data from the FIFO memory 19 and stores it in the data register (step S1610). After that, while the value of the counter is larger than "0", the decoding circuit 20 outputs the data stored in the data register every time data is requested from the shift register 21, and decrements the value of the counter by "1" (steps S1605 to S1607).

If command code C assumes a value ranging from "0x80" to "0xBF", i.e., indicates "raw data with length (C-0x7F)" (YES in step S1611), the decoding circuit 20 computes the length of raw data based on command code C and sets it in the counter (step S1612). After that, while the value of the counter is larger than "0", the decoding circuit 20 reads 1-byte data from the FIFO memory 19 and outputs it every time data is requested from the shift register 21, and decrements the value of counter by "1" (steps S1613 to S1615).

If command code C assumes a value ranging from "0xC0" to "0xFF", i.e., indicates "0x40 with unity length+raw data with length (C-0xBF)" (NO in step S1611), the decoding circuit 20 computes the length of raw data based on command code C and sets it in the counter (step S1616) and stores "0x40" in the data register (step S1617). In response to the first data request from the shift register 21 since then, the decoding circuit 20 outputs the data stored in the data register (step S1618). After that, while the value of the counter is larger than "0", the decoding circuit 20 reads 1-byte data from the FIFO memory 19 and outputs it every time data is requested from the shift register 21, and decrements the value of counter by "1" (steps S1613 to S1615).

With the aforementioned sequence, data encoded and operated by the host computer are decoded to original data.

In this manner, isochronous data transfer can be done using an asynchronous communication interface. "0x40" is determined as a predetermined value, and the host computer encodes source bitmap data so that encoded data does not include that value, operates the encoded data using the value "0x40" so that successive bytes have different values, and sends the operated data via the parallel interface.

In the printer on the receiving side, a clock is generated in response to a change in bit of 8-bit parallel received signals, and data is received in synchronism with that clock. The received data is restored to the encoded data using the value "0x40", and the encoded data is decoded to bitmap data before encoding.

For this reason, the need for handshake control in units of bytes can be obviated, and the handshake control is required only at the beginning of a series of data transfer processes. After that, when the sender side outputs data to be transferred onto a communication line at predetermined time intervals, the receiver side can generate a clock from the data, thus allowing high-speed data transfer. In this case, since it is guaranteed that successive 2-byte data always have different values, the receiver side can generate clocks in units of bytes, and can reliably receive data.

As one operand for EX-ORing used in the sequence for guaranteeing that successive 2-byte data always have different values, a predetermined value (0x40 in this embodiment) other than zero is used. Source data is encoded not to include this value. Also, since a command indicating "raw data that follows this predetermined value (0x40)" is prepared, and the data length is encoded in a command code, the encoding efficiency can be prevented from impairing. When a value with the minimum frequency of occurrence after encoding is selected as the predetermined value, a decrease in compression ratio can be minimized.

[Modification of Embodiment]

In the above embodiment, codes that express data include "a run of arbitrary data with length n", "a run of 0x40 with length n", "raw data with length n", and "raw data length n that follows 0x40 with unity length". In place of these codes, arbitrary codes that can encode not to include predetermined byte data, e.g., "a run of arbitrary data with length m+raw data with length n", "a run of 0x40 with length m+raw data with length n", "copy of previously scanned data with length n", and the like may be used.

In the above embodiment, the start of transmission of a code sequence is notified by outputting "L" to the control signal nStrobe after command "0x00" is output. Alternatively, the start of transmission of a code sequence may be notified by arbitrary methods, e.g., by setting extended link mode specified by IEEE standards "IEEE Std 1284-1994".

In the above embodiment, the host computer is notified as to whether or not a free space of 8 KB or more as the maximum value of the transfer block size is available, using the status signal Busy. Alternatively, whether or not a free space is available may be notified by arbitrary methods, e.g., by transferring data from the printer to the host computer by nibble mode transfer or ECP mode transfer specified by IEEE standards "IEEE Std 1284-1994".

In the above embodiment, predetermined byte data that cannot be included in encoded bytes is fixed. Alternatively, the following modification may be made. That is, the encoding program selects optimal byte data in accordance with the distribution of source data in every encoding, encodes the data based on the selected predetermined byte data, and informs the arithmetic operation program of the selected predetermined byte data. The arithmetic operation program operates using the selected predetermined byte data, and informs the latch circuit of the printer of the value of the selected predetermined byte data. For this purpose, for example, data at the trailing edge of the control signal nStrobe may be used as the selected predetermined byte data, or the selected predetermined byte data may be selected by a predetermined command. The latch circuit may hold the informed predetermined byte data, and may output operated results obtained by arithmetic operations using the informed predetermined byte data.

In the above embodiment, the arithmetic operation program EX-ORs two data and 0x40. Alternatively, the arithmetic operation program may convert a code data sequence which does not include predetermined byte data into a data sequence in which identical data do not successively appear, and may then make an arbitrary arithmetic operation having an inverse operation, e.g., EX-ORing or subtraction of two data.

In the above embodiment, parallel data has an 8-bit width. But this width is not particularly limited. In such case, the widths of the flip-flops and gates in FIG. 9 are changed in correspondence with the parallel data width.

In the above embodiment, the receiver side decodes received data by hardware. However, when a sufficiently fast processor is used, the decoding process may be done by software as in the sender side. In such case, a program that implements the function corresponding to the circuit shown in FIG. 9 is executed to generate a clock and to make an arithmetic operation shown in FIG. 5.

Also, the circuit shown in FIG. 9 can be divided into a section for making an arithmetic process (blocks 30 and 40 to 48), and a section for generating a clock signal (blocks 31, 32, and 40 to 43). Of these sections, the arithmetic processing section shown in FIG. 9 may be implemented by software, and the clock generation section may be implemented by hardware.

Furthermore, the decoding process of the decoding circuit 20 can also be implemented by software.

Note that the objects of the present invention are also achieved by supplying a storage medium, which records program codes of software that can implement the functions of the above-mentioned embodiments to a system or apparatus, and reading out and executing the program code stored in the storage medium by a computer (or a CPU or MPU) of the system or apparatus. In this case, the program codes recorded in the storage medium include a program code for implementing the sequences shown in FIGS. 12 to 15 in the host computer, and a program code for implementing the sequence corresponding to the logic circuit shown in FIG. 9 and a program code for implementing the sequence shown in FIGS. 16 and 17 in the printer.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

[Effect of Invention]

To restate, according to this embodiment a transfer clock can be automatically generated from parallel data received via a versatile parallel port, and desired output data can be transferred at high speed by fully using all bits that can be transferred, without reducing the transfer bit width by assigning a clock bit in advance unlike in the prior art.

Since the method of the present invention has no restriction that identical code bytes must not successively appear, the compression ratio can be prevented from impairing due to insertion of fixed byte data.

Upon converting into byte data that does not include a predetermined value, since a code indicating raw data that follows the predetermined value is included, and the length of the raw data is included in a command code, the compression ratio hardly impairs.

As many apparently widely different embodiments of the present invention can be made without departing from the spirit and scope thereof, it is to be understood that the invention is not limited to the specific embodiments thereof except as defined in the appended claims.

What is claimed is:

1. A communication control apparatus connected to a receiver, comprising:
    a parallel port for sending parallel data including data having a predetermined width as one set;
    first encoding means for encoding source data to produce encoded data not including a predetermined value; and
    second encoding means for encoding, based on the predetermined value, the encoded data produced by said first encoding means to produce second encoded data in which two successive sets of data are different,
    wherein said parallel port sends the second encoded data produced by said second encoding means.

2. The apparatus according to claim 1, wherein said second encoding means outputs as the second encoded data an EX-OR of a first set of encoded data produced by said first encoding means, a second set of data immediately before the first set of data, and the predetermined value.

3. The apparatus according to claim 2, wherein said second encoding means outputs as the second encoded data an EX-OR of a first set of encoded data produced by said first encoding means, an arbitrary initial value, and the predetermined value.

4. The apparatus according to claim 1, wherein said parallel port waits without changing data whose sending is underway until a busy signal is canceled, upon receiving the busy signal from the receiver.

5. The apparatus according to claim 1, wherein said parallel port cancels sending upon receiving a busy signal from the receiver.

6. A communication control apparatus connected to a receiver, comprising:
- a parallel port for sending parallel for sending parallel data including data having a predetermined width as one set;
- first encoding means for encoding source data to produce encoded data not including a predetermined value; and
- second encoding means for encoding, based on the predetermined value, the encoded data produced by said first encoding means to produce second encoded data in which two successive sets of data are different,
- wherein said parallel port sends the second encoded data produced by said second encoding means,
- wherein said first encoding means encodes a data sequence, which is included in the source data and has a run of the predetermined value, to a code indicating the data sequence which has a run of the predetermined value,
- wherein said first encoding means encodes a data sequence, which is included in the source data and has a run of a value other than the predetermined value, to a code indicating the data sequence having a run of the value other than the predetermined value, and the value other than the predetermined value,
- wherein said first encoding means encodes a data sequence, which is included in the source data and includes the predetermined value as first data and data that follows the predetermined value, to a code indicating the data sequence which includes the predetermined value as the first data, and the data that follows the predetermined value, and
- wherein said first encoding means encodes a data sequence, which is included in the source data and includes neither the predetermined value nor a run, to a code indicating the data sequence that includes neither the predetermined value nor a run, and the data sequence.

7. A communication control apparatus connected to a sender, comprising:
- a parallel port for receiving parallel data, which includes data having a predetermined width as one set, wherein the sender encodes source data to produce encoded data not including a predetermined value, encodes based on the predetermined value the encoded data to produce second encoded data in which two successive sets of data are different, and sends the second encoded data as the parallel data;
- clock generation means for generating a clock signal on the basis of a change between the two successive sets of data in the second encoded data received by said parallel port; and
- a register for storing a set of data received via said parallel port in response to the clock signal generated by said clock generation means.

8. The apparatus according to claim 7, wherein said clock generation means EX-ORs a first set of encoded data, and a second set of data received immediately before the first set of data, ORs all bits of the EX-ORs, and outputs the OR as the clock signal.

9. The apparatus according to claim 7, further comprising decoding means for calculating an EX-OR of a first set of encoded data stored in said register, a second set of data received by said parallel port immediately before the first set of data, and the predetermined value to decode a set of data stored in said register.

10. A communication system comprising:
- a sender having a parallel port for sending parallel data including data having a predetermined width as one set;
- first encoding means for encoding source data to produce encoded data not including a predetermined value;
- second encoding means for encoding, based on the predetermined value, the encoded data produced by said first encoding means to produce second encoded data in which two successive sets of data are different,
- wherein said parallel port sends the second encoded data produced by said second encoding means, and
- a receiver having a parallel port for receiving parallel data, which includes data having a predetermined width as one set;
- clock generation means for generating a clock signal on the basis of a change between the two successive sets of the second encoded data in data received by said parallel port; and
- a register for storing a set of data received via said parallel port in response to the clock signal generated by said clock generation means,
- wherein said parallel port sends the second encoded data produced by said second encoding means, and
- wherein said first encoding means encodes a data sequence, which is included in the source data and has a run of the predetermined value, to a code indicating the data sequence which has a run of the predetermined value,
- wherein said first encoding means encodes a data sequence, which is included in the source data and has a run of a value other than the predetermined value, to a code indicating the data sequence having a run of the value other than the predetermined value, and the value other than the predetermined value,
- wherein said first encoding means encodes a data sequence, which is included in the source data and includes the predetermined value as first data and data that follows the predetermined value, to a code indicating the data sequence which includes the predetermined value as the first data, and the data that follows the predetermined value, and
- wherein said first encoding means encodes a data sequence, which is included in the source data and includes neither the predetermined value nor a run, to a code indicating the data sequence that includes neither the predetermined value nor a run, and the data sequence.

11. A communication control method comprising:
- a first encoding step, of encoding source data to produce encoded data not including a predetermined value; and
- a second encoding step, of encoding, based on the predetermined value, the encoded data produced in said first encoding step to produce second encoded data in which two successive sets of data are different; and
- a sending step, of sending each of sets of the second encoded data produced in the second encoding step as parallel data including data having a predetermined width as one set.

12. The method according to claim 11, wherein said second encoding step comprises the step of calculating an exclusive OR of a first set of encoded data produced in said first encoding step, a second set of data encoded in said second encoding step immediately before the first set of data, and the predetermined value.

13. The method according to claim 12, wherein said second encoding step includes the step of calculating an EX-OR of a first set of encoded data in said first encoding step, an arbitrary initial value, and the predetermined value.

14. The method according to claim 11, wherein said sending step includes the step of waiting without changing data whose sending is underway until a busy signal is canceled, upon receiving the busy signal from a receiver.

15. The method according to claim 11, wherein said sending step includes the step of canceling sending upon receiving a busy signal from a receiver.

16. The method according to claim 11, further comprising:
- a receiving step, of receiving the parallel data;
- a generation step, of generating a signal on the basis of a change between two successive sets of data in the second encoded data received in said receiving step; and
- a storage step, of storing a set of data received in said receiving step in response to the signal generated in said signal generation step.

17. The method according to claim 16, wherein said generation step includes the step of calculating an EX-OR of a first set of encoded data, and a second set of data received immediately before the first set of data, the step of calculating OR of all bits of the EX-OR, and the step of outputting the OR as the signal.

18. The method according to claim 16, further comprising a decoding step, of calculating an EX-OR of a first set of encoded data stored in said storage step, a second set of data decoded immediately before the first set of data, and the predetermined value.

19. A communication control method comprising:
- a first encoding step, of encoding source data to produce encoded data not including a predetermined value;
- a second encoding step, of encoding, based on the predetermined value, the encoded data produced in said first encoding step to produce second encoded data in which two successive sets of data are different; and
- a sending step, of sending each of sets of second encoded data produced in said second encoding step as parallel data including data having a predetermined width as one set, wherein said first encoding step includes the steps of:

encoding a data sequence, which is included in the source data and has a run of the predetermined value, to a code indicating the data sequence which has a run of the predetermined value;

encoding a data sequence, which is included in the source data and has a run of a value other than the predetermined value, to a code indicating the data sequence having a run of the value other than the predetermined value, and the value other than the predetermined value;

encoding a data sequence, which is included in the source data and includes the predetermined value as first data and that data follows the predetermined value, to a code indicating the data sequence which includes the predetermined value as the first data, and the data that follows the predetermined value; and encoding a data sequence, which is included in the source data and includes neither the predetermined value nor a run, to a code indicating the data sequence that includes neither the predetermined value nor a run, and the data sequence.

* * * * *